(12) United States Patent  
Wang et al.

(10) Patent No.: US 9,363,059 B2
(45) Date of Patent: Jun. 7, 2016

(54) METHOD OF HANDLING COMPONENT CARRIER ACTIVATION AND DEACTIVATION AND COMMUNICATION DEVICE THEREOF

(75) Inventors: Chun-Yen Wang, New Taipei (TW); Tzu-Ming Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 13/071,519

(22) Filed: Mar. 25, 2011

(65) Prior Publication Data

US 2011/0243048 A1  Oct. 6, 2011

Related U.S. Application Data

(60) Provisional application No. 61/320,486, filed on Apr. 2, 2010.

(51) Int. Cl.
*H04L 5/00* (2006.01)
*H04L 1/18* (2006.01)
*H04W 76/06* (2009.01)

(52) U.S. Cl.
CPC ............ *H04L 5/0051* (2013.01); *H04L 1/1874* (2013.01); *H04L 1/1887* (2013.01); *H04L 5/0055* (2013.01); *H04L 5/0057* (2013.01); *H04L 5/0098* (2013.01); *H04W 76/068* (2013.01)

(58) Field of Classification Search
None
See application file for complete search history.

(56) References Cited

U.S. PATENT DOCUMENTS

| | | | |
|---|---|---|---|
| 6,603,978 B1* | 8/2003 | Carlsson et al. | 455/502 |
| 2004/0127265 A1* | 7/2004 | Van Bosch et al. | 455/574 |
| 2005/0163161 A1 | 7/2005 | Wei | |
| 2006/0013257 A1* | 1/2006 | Vayanos | 370/473 |
| 2008/0233941 A1* | 9/2008 | Jen | 455/418 |
| 2009/0046650 A1* | 2/2009 | Dalsgaard et al. | 370/329 |
| 2009/0163161 A1 | 6/2009 | Robinson | |
| 2009/0225709 A1 | 9/2009 | Wager | |

(Continued)

FOREIGN PATENT DOCUMENTS

| | | | | |
|---|---|---|---|---|
| CN | 101411095 A | 4/2009 | | |
| EP | 1871057 A1 * | 12/2007 | | H04L 12/56 |

(Continued)

OTHER PUBLICATIONS

U.S. Appl. No. 61/26,2810, Pelletier et al. (provides earlier filing date support for 2011/0134774), all pages.*

(Continued)

*Primary Examiner* — Huy D Vu
*Assistant Examiner* — James P Duffy
(74) *Attorney, Agent, or Firm* — Winston Hsu; Scott Margo

(57) ABSTRACT

A method of handling component carrier activation and deactivation for a mobile device capable of receiving and transmitting on a plurality of component carriers in a wireless communication system is disclosed. The method includes starting a deactivation timer for a component carrier of the plurality of component carriers when the component carrier is activated, wherein the deactivation timer provides a period of time for component carrier activation, performing a Hybrid Automatic Repeat Request (HARQ) process on the component carrier, and extending activation time of the component carrier when a retransmission of the HARQ process is not finished before deactivation of the component carrier.

52 Claims, 29 Drawing Sheets

(56) References Cited

U.S. PATENT DOCUMENTS

| | | | |
|---|---|---|---|
| 2009/0239566 A1* | 9/2009 | Pelletier et al. | 455/517 |
| 2010/0008278 A1* | 1/2010 | Kone et al. | 370/311 |
| 2010/0037114 A1 | 2/2010 | Huang | |
| 2010/0037115 A1* | 2/2010 | Zheng | 714/749 |
| 2010/0074202 A1 | 3/2010 | Park | |
| 2010/0113004 A1* | 5/2010 | Cave et al. | 455/422.1 |
| 2011/0134774 A1* | 6/2011 | Pelletier et al. | 370/252 |
| 2011/0205928 A1* | 8/2011 | Pelletier et al. | 370/252 |
| 2012/0281655 A1* | 11/2012 | Jung et al. | 370/329 |

FOREIGN PATENT DOCUMENTS

| | | |
|---|---|---|
| JP | 2009531947 A | 9/2009 |
| JP | 2009253548 | 10/2009 |
| KR | 1020110093632 A | 8/2011 |
| KR | 1020110109148 A | 10/2011 |
| TW | 200729812 | 8/2007 |
| TW | 200908592 | 2/2009 |
| TW | 200931869 | 7/2009 |
| TW | 200934266 | 8/2009 |
| TW | 201014424 | 4/2010 |
| WO | 2007111480 | 10/2007 |
| WO | 2009043375 A1 | 4/2009 |
| WO | 2009119477 A1 | 10/2009 |
| WO | 2010051209 A1 | 5/2010 |

OTHER PUBLICATIONS

U.S. Appl. No. 61/293,185, Jung et al. (provides earlier filing date support for 2012/0281655), pp. 1 and 273.*

Panasonic, Open issues on component carrier activation and deactivation, 3GPP TSG-RAN WG2 Meeting #69, R2-101082, Feb. 22-26, 2010 in San Francisco, CA, USA.

Research in Motion, UK Limited, Component Carrier Activation and Deactivation, 3GPP TSG RAN WG2 Meeting #69, R2-101473, San Francisco, USA, Feb. 22-26, 2010, p. 1-p. 3.

Ericsson, ST-Ericsson, "Further details of activation/ deactivation", 3GPP TSG-RAN WG2 #69, Tdoc R2-101179, Feb. 22-26, 2010, p. 1-p. 2, San Francisco, USA.

Huawei, "Mechanisms for (de)activation", 3GPP TSG RAN WG2 Meeting #69, R2-101030, Feb. 22-Feb. 26, 2010, p. 1-p. 2, San Francisco, US.

Ericsson, ST-Ericsson, "Activation and deactivation of component carriers", 3GPP TSG-RAN WG2 #68, Tdoc R2-096752, Oct. 9-13, 2009, p. 1-4, Jeju, Korea, Oct. 9, 2009.

Fujitsu, Discussions on CC activation/de-activation, 3GPP TSG-RAN WG2 Meeting #68bis, Jan. 18-22, 2010, pp. 1-3, R2-100107, Valencia, Spain, XP050420932.

* cited by examiner

METHOD OF HANDLING COMPONENT CARRIER ACTIVATION AND DEACTIVATION AND COMMUNICATION DEVICE THEREOF

CROSS REFERENCE TO RELATED APPLICATIONS

This application claims the benefit of U.S. Provisional Application No. 61/320,486, filed on Apr. 2, 2010 and entitled "Methods and Systems for Implicit Deactivation of Component Carriers in Multiple Carrier Systems" the contents of which are incorporated herein in their entirety.

BACKGROUND OF THE INVENTION

1. Field of the Invention

The application relates to a method utilized in a wireless communication system and a communication device thereof, and more particularly, to a method of handling component carrier activation and deactivation in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Architecture of the radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers or cells are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In the LTE-Advanced system, a UE in a radio resource control (RRC) connected state is configured with multiple component carriers to communicate with the network (i.e. an eNB). Since the UE may not need to use all of the configured component carrier cc#1-cc#m, only some of the multiple component carriers are activated. Generally, the eNB activates or deactivates a component carrier by sending a signalling (e.g. a MAC control element) to the UE. In addition, the UE starts a deactivation timer for the component carrier when the component carrier is activated, wherein the component carrier is deactivated when the deactivation timer expires. In other words, the deactivation timer provides a period of time for component carrier activation. Please note that, when the component carrier is deactivated, the UE does not need to receive or transmit the corresponding PDCCH or physical downlink shared channel (PDSCH), nor require to perform channel quality indicator (CQI) measurement on the component carrier. Conversely, when the component carrier is activated, the UE shall receive or transmit PDSCH and PDCCH, and is expected to be able to perform CQI measurement.

Based on the abovementioned description, the applicant noticed a problem related to deactivation of component carrier(s), and several scenarios are described as follows.

In the first scenario, a retransmission of a Hybrid Automatic Repeat Request (HARQ) process performed on an activated component carrier is not finished when UE receives a signalling (e.g., MAC control element) which commands the UE to deactivate the component carrier or a deactivation timer corresponding to the activated component carrier expires. More specifically, for uplink transmission, the UE receives Physical Downlink Control Channel (PDCCH) or Physical Hybrid ARQ Indicator channel (PHICH) for a HARQ feedback (e.g. HARQ positive acknowledgement (ACK) or negative acknowledgement (NACK)) if an uplink grant for a pending HARQ process retransmission occurs or there is data in a HARQ buffer corresponding to the HARQ process. However, when the UE receives HARQ ACK/NACK on the activated component carrier, the UE may not be able to finish a HARQ process retransmission triggered according to the HARQ ACK/NACK before deactivation of the component carrier (e.g. due to receiving a deactivation MAC command or expiry of the deactivation timer), causing HARQ process retransmission loss. On the other hand, for downlink transmission, the UE receives PDCCH/PDSCH on the activated component carrier, and starts HARQ round trip time (RTT) timer for the component carrier. The HARQ RU timer means the minimum amount of subframes before a downlink HARQ retransmission is expected by the UE. However, the component carrier may be deactivated during duration of the HARQ RTT timer. Therefore, the downlink HARQ process retransmission cannot be received by the UE due to deactivation of the component carrier, after the HARQ RTT timer expires, causing HARQ retransmission loss. Note that, the HARQ process shall be well-known in the art, so the detailed description for the HARQ functionality and operation are omitted herein.

In the second scenario, when the UE has new uplink data to transmit but has no uplink resource available, the UE triggers a Scheduling Request (SR) procedure to request the network to allocate the uplink resource. Note that, when the SR procedure is triggered, the UE considers the SR procedure as pending until the uplink resource is received. In addition, the uplink resource may be allocated in any of the activated component carriers. However, the uplink resource may not be received before deactivation of the component carrier (e.g. due to receiving a deactivation command or expiry of the deactivation timer corresponding to the activated component carrier). Thus, the UE loses the uplink opportunity to perform uplink data transmission.

In the third scenario, a discontinuous reception (DRX) operation allows the UE to monitor signaling of the PDCCH only during certain configured periods (e.g. called DRX active time) in order to save UE power. However, the component carrier may be deactivated (e.g. due to receiving a deactivation command or expiry of the deactivation timer) during the DRX active time, and thereby the UE can not monitor the PDCCH during the DRX active time, causing the time for monitoring PDCCH decreasing.

In the fourth scenario, the UE performs a random access procedure for uplink synchronization or for initial cell access. During the random access procedure, a contention resolution message (or a random access response message) of the random access procedure may be allocated in any of the activated component carriers. However, the UE may not receive the contention resolution message (or a random access response message) before deactivation of the component carrier (e.g. due to receiving a deactivation command or expiry of the deactivation timer). Thus, the random access procedure cannot be finished, causing uplink synchronization and initial cell access failure.

In the fifth scenario, a PDCCH assignment for a component carrier may be transmitted on the same or different component carrier. That is, a first component carrier may receive a PDCCH assignment for a second component carrier (called cross component carrier scheduling). However, the first component carrier may be deactivated (e.g., due to receiving a deactivation command or expiry of the deactivation timer), and thereby cannot receive the PDCCH assignment for the second component carrier, causing cross component carrier scheduling failure.

In the sixth scenario, UE may still have data in near future when the deactivation timer is going to be expired. For example, the UE receives a PDCCH or PDSCH assignment indicating a new downlink/uplink transmission on an activated component carrier, and thereby knows that there is an upcoming data for reception/transmission. However, the UE is unable to receive/transmit the upcoming data due to deactivation of the component carrier (e.g. due to receiving a deactivation command or expiry of the deactivation timer), causing downlink/uplink transmission unfinished or failure.

SUMMARY OF THE INVENTION

The application discloses a method of handling component carrier activation and deactivation in a wireless communication system and a related communication device in order to solve the abovementioned problems.

A method of handling component carrier activation and deactivation for a mobile device capable of receiving and transmitting on a plurality of component carriers in a wireless communication system is disclosed. The method comprises starting a deactivation timer for a component carrier of the plurality of component carriers when the component carrier is activated, wherein the deactivation timer provides a period of time for component carrier activation, performing a Hybrid Automatic Repeat Request (HARQ) process on the component carrier, and extending activation time of the component carrier when a retransmission of the HARQ process is not finished before deactivation of the component carrier.

A method of handling component carrier activation and deactivation for a mobile device capable of receiving and transmitting on a plurality of component carriers in a wireless communication system is disclosed. The method comprises performing a Hybrid Automatic Repeat Request (HARQ) process on an activated component carrier of the plurality of component carriers, and continuing a retransmission of the HARQ process next time the component carrier is activated when the HARQ process retransmission is not finished before deactivation of the component carrier.

A method of handling component carrier activation and deactivation for a network in a wireless communication system comprising a mobile device capable of receiving and transmitting on a plurality of component carriers is disclosed. The method comprises performing a Hybrid Automatic Repeat Request (HARQ) process on an activated component carrier of the plurality of component carriers, and continuing a retransmission of the HARQ process next time the component carrier is activated when the HARQ process retransmission is not finished before deactivation of the component carrier.

A method of handling component carrier activation and deactivation for a mobile device capable of receiving and transmitting on a plurality of component carriers in a wireless communication system is disclosed. The method comprises starting a deactivation timer for a component carrier of the plurality of component carriers when the component carrier is activated, wherein the deactivation timer provides a period of time for component carrier activation, initiating a scheduling request (SR) procedure, and extending activation time of the component carrier when an uplink resource corresponding to the SR procedure is not received before deactivation of the component carrier.

A method of handling component carrier activation and deactivation for a mobile device capable of receiving and transmitting on a plurality of component carriers in a wireless communication system is disclosed. The method comprises starting a deactivation timer for a component carrier of the plurality of component carriers when the component carrier is activated, wherein the deactivation timer provides a period of time for component carrier activation, performing a discontinuous reception (DRX) operation on the component carrier, and extending activation time of the component carrier when the component carrier is going to be deactivated during an DRX active time of a DRX cycle of the DRX operation.

A method of handling component carrier activation and deactivation for a mobile device capable of receiving and transmitting on a plurality of component carriers in a wireless communication system is disclosed. The method comprises starting a deactivation timer for a component carrier of the plurality of component carriers when the component carrier is activated, wherein the deactivation timer provides a period of time for component carrier activation, performing a random access procedure, and extending activation time of the component carrier when the random access procedure is not finished before deactivation of the component carrier.

A method of handling component carrier activation and deactivation for a mobile device capable of receiving and transmitting on a plurality of component carriers in a wireless communication system is disclosed. The method comprises starting a deactivation timer for a component carrier of the plurality of component carriers when the component carrier is activated, wherein the deactivation timer provides a period of time for component carrier activation, receiving a Physical Downlink Control Channel (PDCCH) assignment configured to a first component carrier of the plurality of component carrier, from the component carrier, and extending activation time of the component carrier for reception of the PDCCH assignment for the first component carrier when the component carrier is going to be deactivated.

A method of handling component carrier activation and deactivation for a mobile device capable of receiving and transmitting on a plurality of component carriers in a wireless communication system is disclosed. The method comprises starting a deactivation timer for a component carrier of the plurality of component carriers when the component carrier is activated, wherein the deactivation timer provides a period of time for component carrier activation, receiving a physical downlink shared channel (PDSCH) or Physical Downlink Control Channel (PDCCH) on the component carrier, and extending activation time of the component carrier when an upcoming transmission corresponding to the PDCCH or PDSCH assignment is not finished before deactivation of the component carrier.

A mobile device of a wireless communication system for handling component carrier activation and deactivation is disclosed. The mobile device is capable of receiving and transmitting on a plurality of component carriers, and comprises means for starting a deactivation timer for a component carrier of the plurality of component carriers when the component carrier is activated, wherein the deactivation timer provides a period of time for component carrier activation, means for performing a Hybrid Automatic Repeat Request (HARQ) process on the component carrier, and means for extending activation time of the component carrier when a retransmission of the HARQ process is not finished before deactivation of the component carrier.

A mobile device of a wireless communication system for handling component carrier activation and deactivation is disclosed. The mobile device is capable of receiving and transmitting on a plurality of component carriers, and comprises means for performing a Hybrid Automatic Repeat Request (HARQ) process on an activated component carrier of the plurality of component carriers, and means for continuing a retransmission of the HARQ process next time the component carrier is activated when the HARQ process retransmission is not finished before deactivation of the component carrier.

A network of a wireless communication system for handling component carrier activation and deactivation is disclosed. The wireless communication system comprises a mobile device capable of receiving and transmitting on a plurality of component carriers. The network comprises means for performing a Hybrid Automatic Repeat Request (HARQ) process on an activated component carrier of the plurality of component carriers, and means for continuing a retransmission of the HARQ process next time the component carrier is activated when the HARQ process retransmission is not finished before deactivation of the component carrier.

A mobile device of a wireless communication system for handling component carrier activation and deactivation is disclosed. The mobile device is capable of receiving and transmitting on a plurality of component carriers, and comprises means for starting a deactivation timer for a component carrier of the plurality of component carriers when the component carrier is activated, wherein the deactivation timer provides a period of time for component carrier activation, means for initiating a scheduling request (SR) procedure, and means for extending activation time of the component carrier when an uplink resource corresponding to the SR procedure is not received before deactivation of the component carrier.

A mobile device of a wireless communication system for handling component carrier activation and deactivation is disclosed. The mobile device is capable of receiving and transmitting on a plurality of component carriers, and comprises means for starting a deactivation timer for a component carrier of the plurality of component carriers when the component carrier is activated, wherein the deactivation timer provides a period of time for component carrier activation, means for performing a discontinuous reception (DRX) operation on the component carrier, and means for extending activation time of the component carrier when the component carrier is going to be deactivated during an DRX active time of a DRX cycle of the DRX operation.

A mobile device of a wireless communication system for handling component carrier activation and deactivation is disclosed. The mobile device is capable of receiving and transmitting on a plurality of component carriers, and comprises means for starting a deactivation timer for a component carrier of the plurality of component carriers when the component carrier is activated, wherein the deactivation timer provides a period of time for component carrier activation, means for performing a random access procedure, and means for extending activation time of the component carrier when the random access procedure is not finished before deactivation of the component carrier.

A mobile device of a wireless communication system for handling component carrier activation and deactivation is disclosed. The mobile device is capable of receiving and transmitting on a plurality of component carriers, and comprises means for starting a deactivation timer for a component carrier of the plurality of component carriers when the component carrier is activated, wherein the deactivation timer provides a period of time for component carrier activation, means for receiving a Physical Downlink Control Channel (PDCCH) assignment configured to a first component carrier of the plurality of component carrier, from the component carrier, and means for extending activation time of the component carrier for reception of the PDCCH assignment for the first component carrier when the component carrier is going to be deactivated.

A mobile device of a wireless communication system for handling component carrier activation and deactivation is disclosed. The mobile device is capable of receiving and transmitting on a plurality of component carriers, and comprises means for starting a deactivation timer for a component carrier of the plurality of component carriers when the component carrier is activated, wherein the deactivation timer provides a period of time for component carrier activation, means for receiving a physical downlink shared channel (PDSCH) or Physical Downlink Control Channel (PDCCH) on the component carrier, and means for extending activation time of the component carrier when an upcoming transmission corresponding to the PDCCH or PDSCH assignment is not finished before deactivation of the component carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
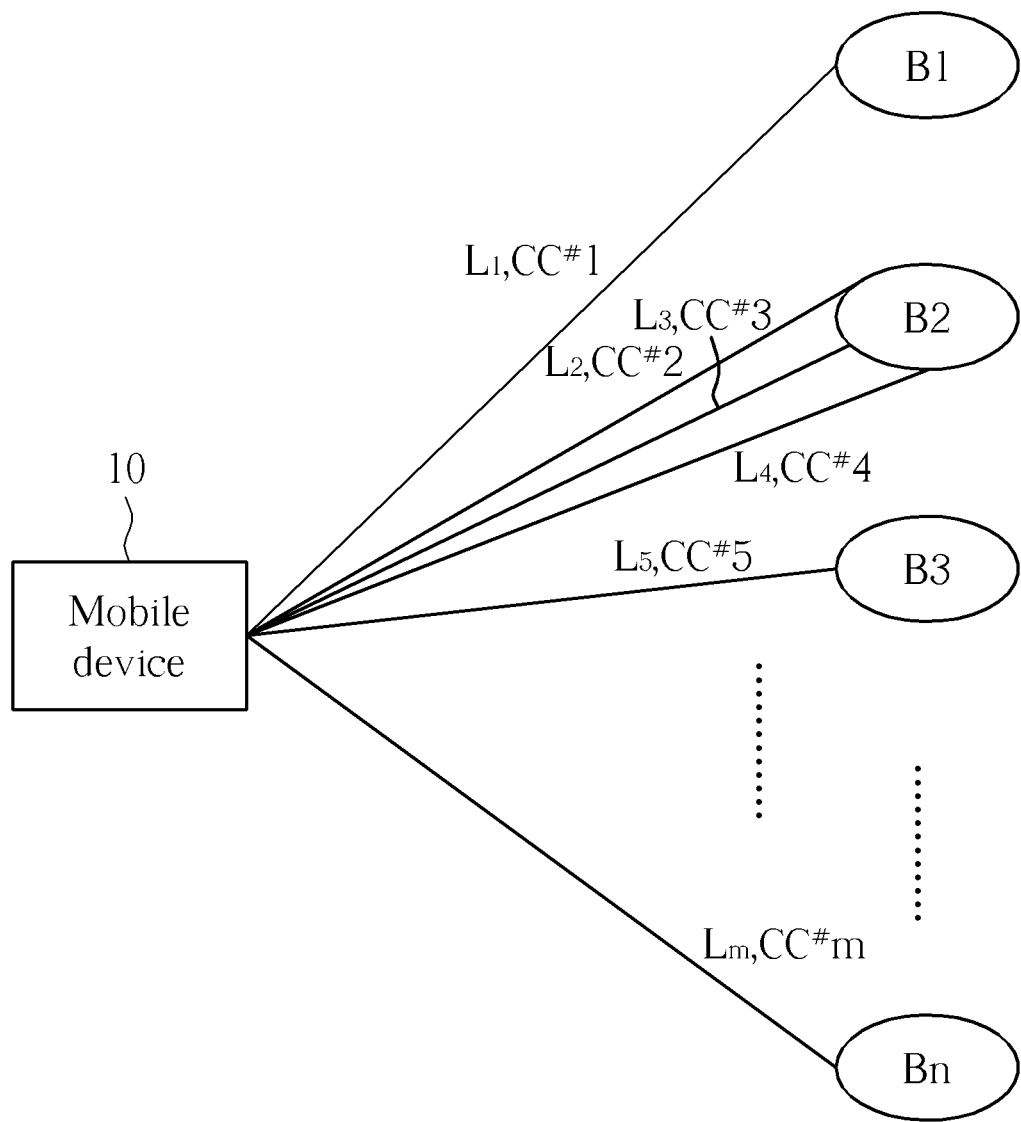
FIG. 1 illustrates a schematic diagram of an exemplary wireless communication system.

Please refer to FIG. 1, which illustrates a schematic diagram of a wireless communication system featuring multiple connections between a mobile device 10 and base stations B1-Bn. The wireless communication system may be a LTE-Advanced system (i.e. an evolved universal terrestrial radio access network (E-UTRAN)) or any other similar network system (e.g., Worldwide Interoperability for Microwave Access (WiMAX)). The mobile device 10 can operate with carrier aggregation or COMP. In FIG. 1, the mobile device 10 communicates with the base stations B1-Bn through radio links $L_1$-$L_m$ that correspond to component carriers cc#1-cc#m configured in the mobile device 10 respectively. Each of the component carriers cc#1-cc#m corresponds to a radio frequency (RF) channel whose bandwidth may be varied according to different communication systems. In addition, the mobile device 10 is referred as an user equipment (UE) or a mobile station (MS), and can be a device such as a mobile phone, a computer system, etc.

Figure 2:
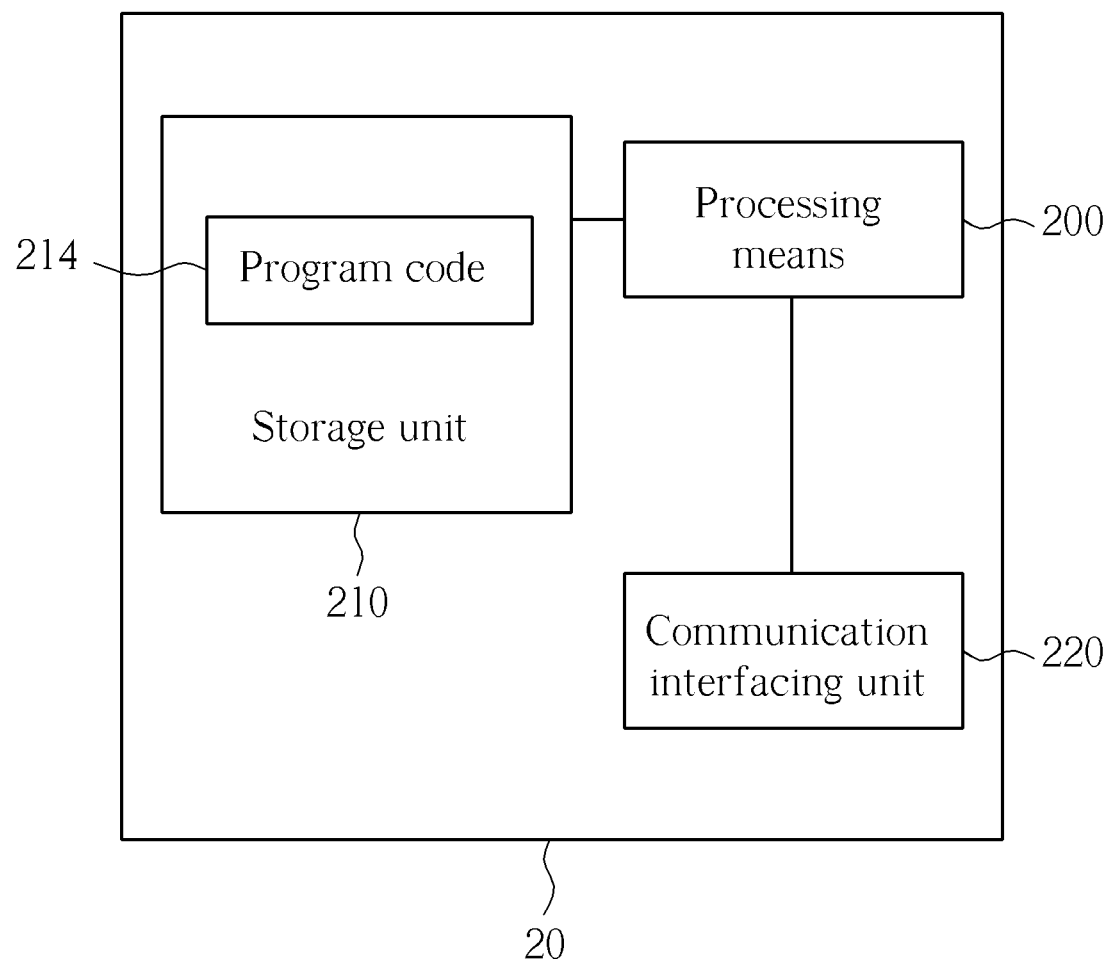
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
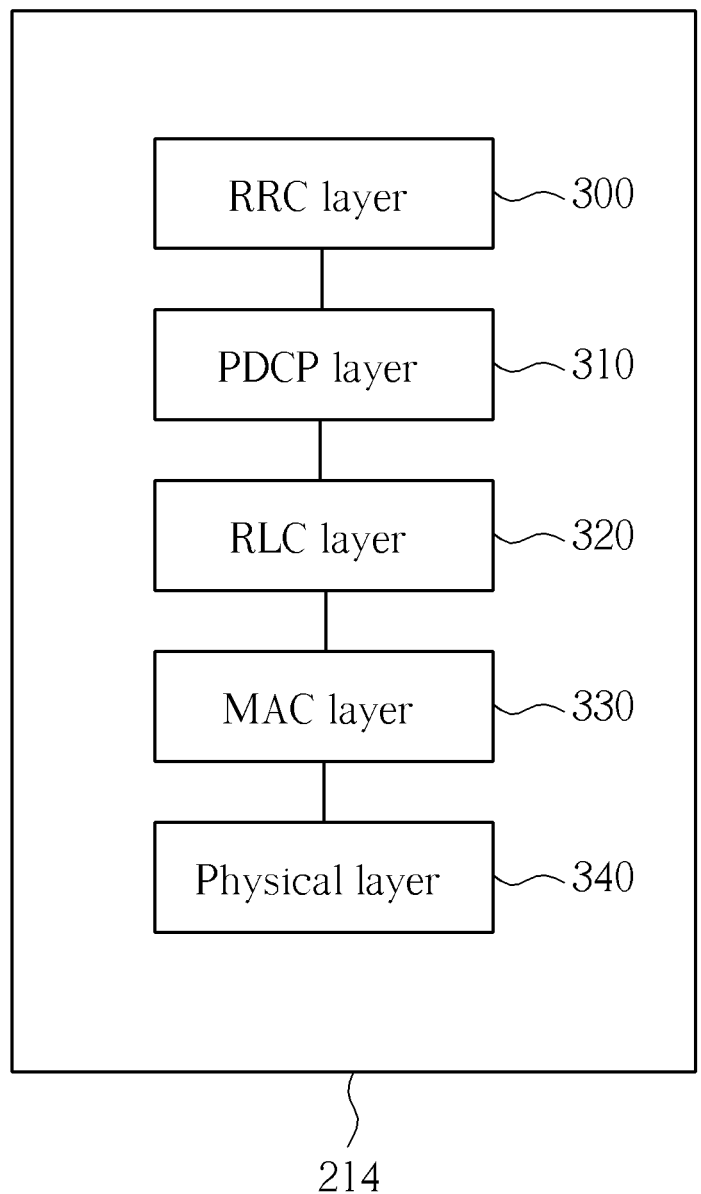
FIG. 3 illustrates a schematic diagram of communication protocol layers for an exemplary communication system.

Please refer to FIG. 3, which illustrates a schematic diagram of communication protocol layers for the LTE-Advanced system. The behaviors of some of the protocol layers may be defined in the program code 214 and executed by the processing means 200. The protocol layers from top to bottom may include a radio resource control (RRC) layer 300, a packet data convergence protocol (PDCP) layer 310, a radio link control (RLC) layer 320, a medium access control (MAC) layer 330 and a physical (PHY) layer 340. Main services and functions of the MAC layer 330 include error correction through HARQ, uplink synchronization through a random access procedure, etc.

In order to avoid mechanism of the deactivation timer causing an on-going process of the mobile device 10 interrupted, such as a Hybrid Automatic Repeat Request (HARQ) retransmission, Scheduling Request (SR) procedure, random access procedure, cross component carrier scheduling, new data transmission, discontinuous reception (DRX) operation, etc, the applicant provides solutions as following.

Figure 4:
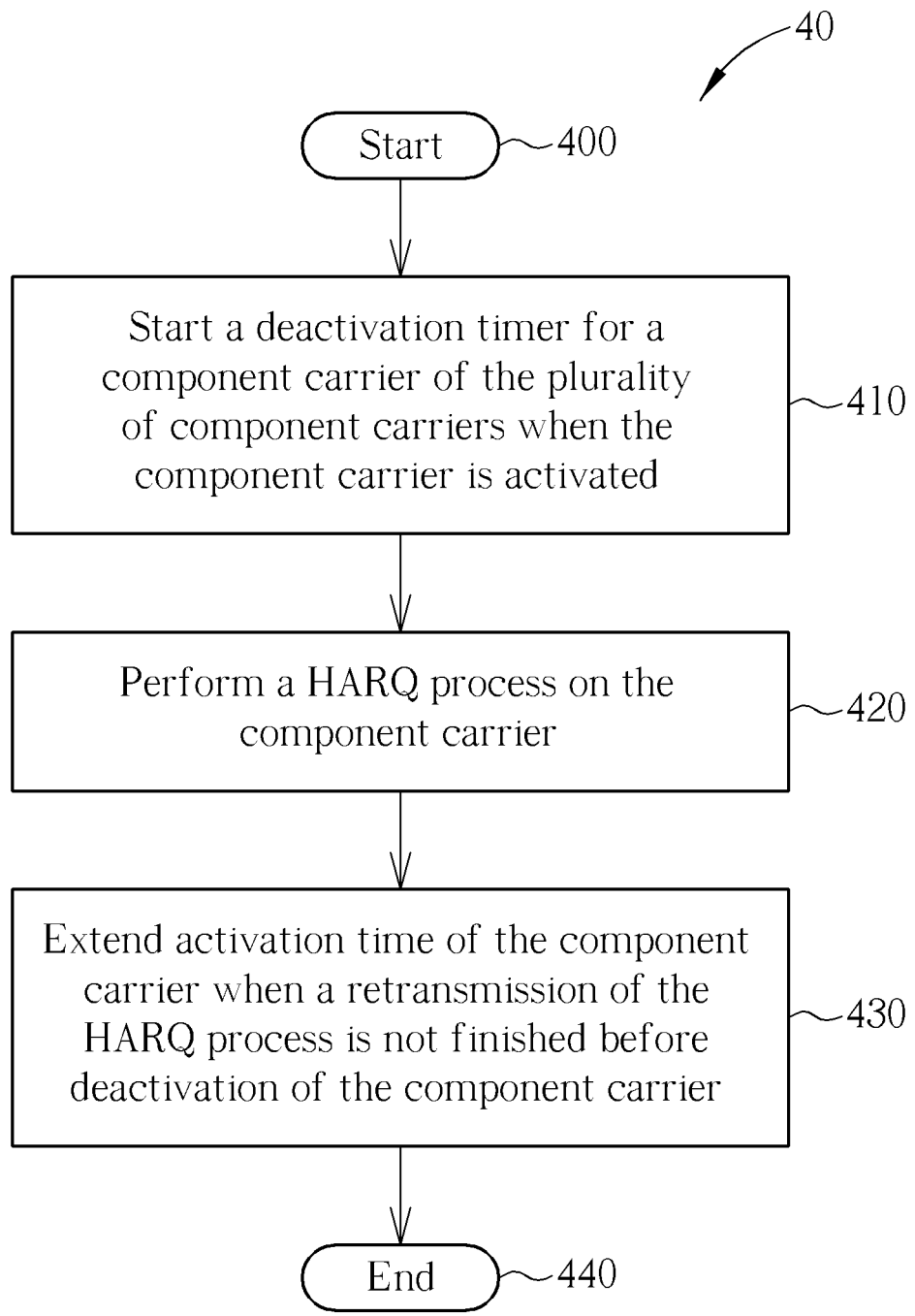
FIG. 4 is a flowchart of an exemplary process.

Please refer to FIG. 4, which illustrates a flowchart of an exemplary process 40. The process 40 is utilized in an UE (e.g. the mobile device 10 of FIG. 1) and/or in a network (e.g. a base station, the E-UTRAN, or an eNB), for handling component carrier activation and deactivation. The process 40 can be compiled into the program code 214 and includes the following steps:

Step 400: Start.

Step 410: Start a deactivation timer for a component carrier of the plurality of component carriers when the component carrier is activated.

Step 420: Perform a HARQ process on the component carrier.

Step 430: Extend activation time of the component carrier when a retransmission of the HARQ process is not finished before deactivation of the component carrier.

Step 440: End.

According to the process 40, when the HARQ process retransmission is not finished during an activation time provided by the deactivation timer for the component carrier, the UE extends activation time of the component carrier, so as to finish the HARQ process retransmission. In other words, the UE extends activation time of the component carrier to keep the component carrier activated, so that the HARQ process retransmission can be performed on the component carrier during the extended time period (e.g. when the UE receives/transmits a HARQ feedback (e.g. a positive acknowledgement (ACK) or a negative acknowledgement (NACK)), but does not transmit/receive the HARQ process retransmission corresponding to the HARQ feedback before the deactivation timer expires), to finish the HARQ process retransmission.

Figure 5A:
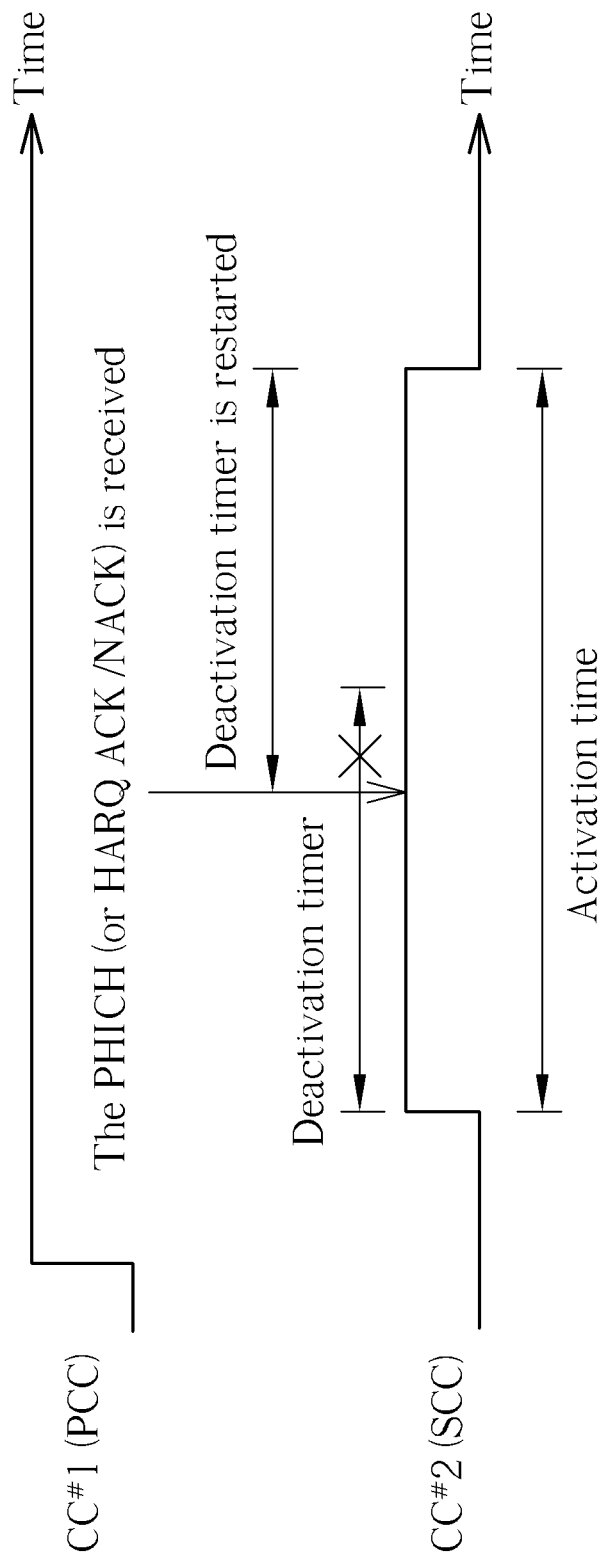
FIG. 5(A)-5(C) are component carrier activation-deactivation time diagrams according to different embodiments.

Take an example based on the process 40. Please refer to FIG. 5(A), which is an activation-deactivation time diagram according to a first embodiment. Briefly, only two component carriers cc#1 and cc#2 are presented. In FIG. 5(A), component carrier cc#1 is a primary component carrier (PCC) and is activated at all time, whereas component carrier cc#2 is a secondary component carrier (SCC) and is activated when a message for component carrier activation is received. Note that, the component carrier activation message for activating the component carrier cc#2 may be transmitted on either the component carrier cc#1 or the component carrier cc#2. Once the component carrier cc#2 is activated, the UE starts a deactivation timer. For uplink transmission, the UE transmits a HARQ packet to the network (i.e. an E-UTRAN, or an eNB), so that the network responses a HARQ feedback (e.g. HARQ ACK/NACK) through a Physical Hybrid ARQ Indicator channel (PHICH). After that, the UE performs a HARQ process retransmission according to the received HARQ ACK/NACK. Generally, the UE transmits a new HARQ packet to the network when receiving the HARQ ACK, whereas retransmits the HARQ packet to the network when receiving the HARQ NACK. However, the UE may not finish the HARQ process retransmission before deactivation of the component carrier (e.g. due to receiving the component carrier deactivation message or expiry of the deactivation timer). In this situation, the UE may restart the deactivation timer for extending activation time of the component carrier cc#2 when the PHICH (or HARQ ACK/NACK) is received, and thereby the HARQ process retransmission may be performed on the component carrier cc#2 during the extended activation time, so as to finish the HARQ process retransmission.

Figure 5B:
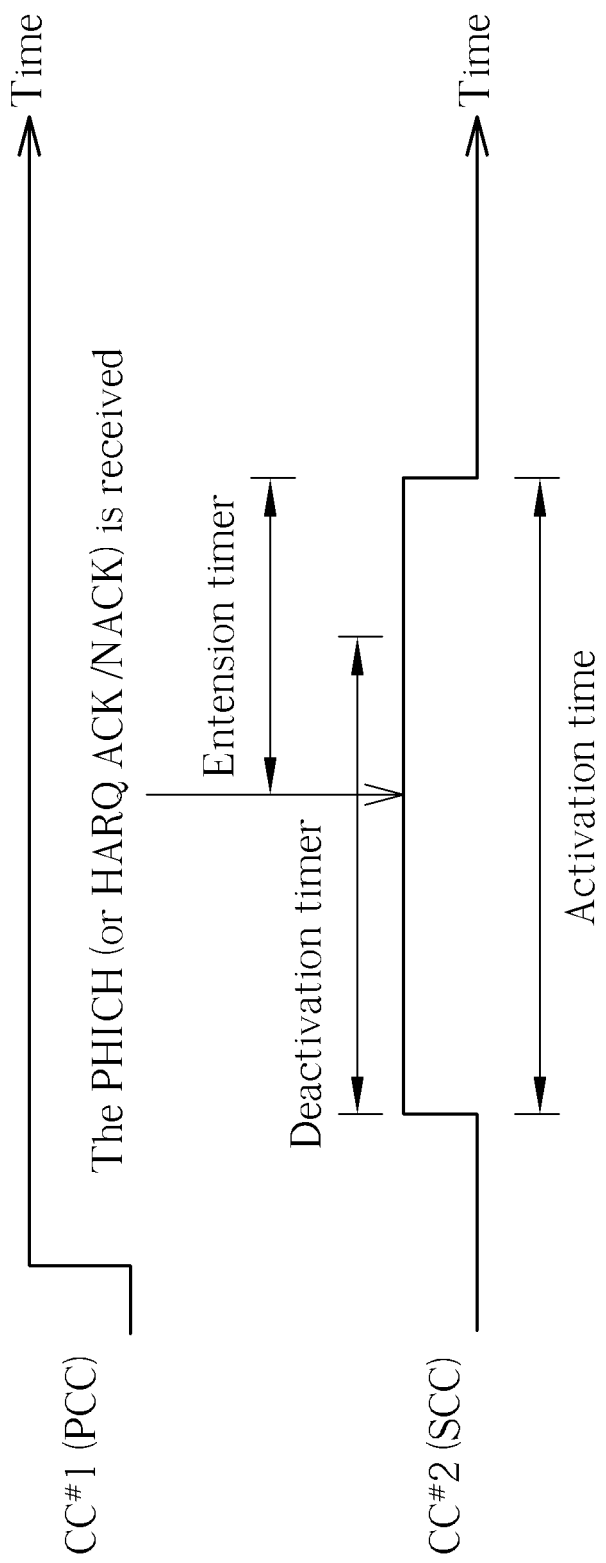

Besides restarting the deactivation timer, the UE can start a specific timer (hereafter called an extension timer), which provides a period time for component carrier activation. Please refer to FIG. 5(B), which is an activation-deactivation time diagram according to a second embodiment. In FIG. 5(B), the UE starts the extension timer T1 for extending activation time of the component carrier cc#2 when the PHICH (or HARQ ACK/NACK) is received. Therefore, the HARQ process retransmission may be performed on the component carrier cc#2 during the extended activation time, so as to finish the HARQ process retransmission. Once the deactivation timer and the extension TIMER T1 expire, the component carrier is deactivated.

Figure 5C:
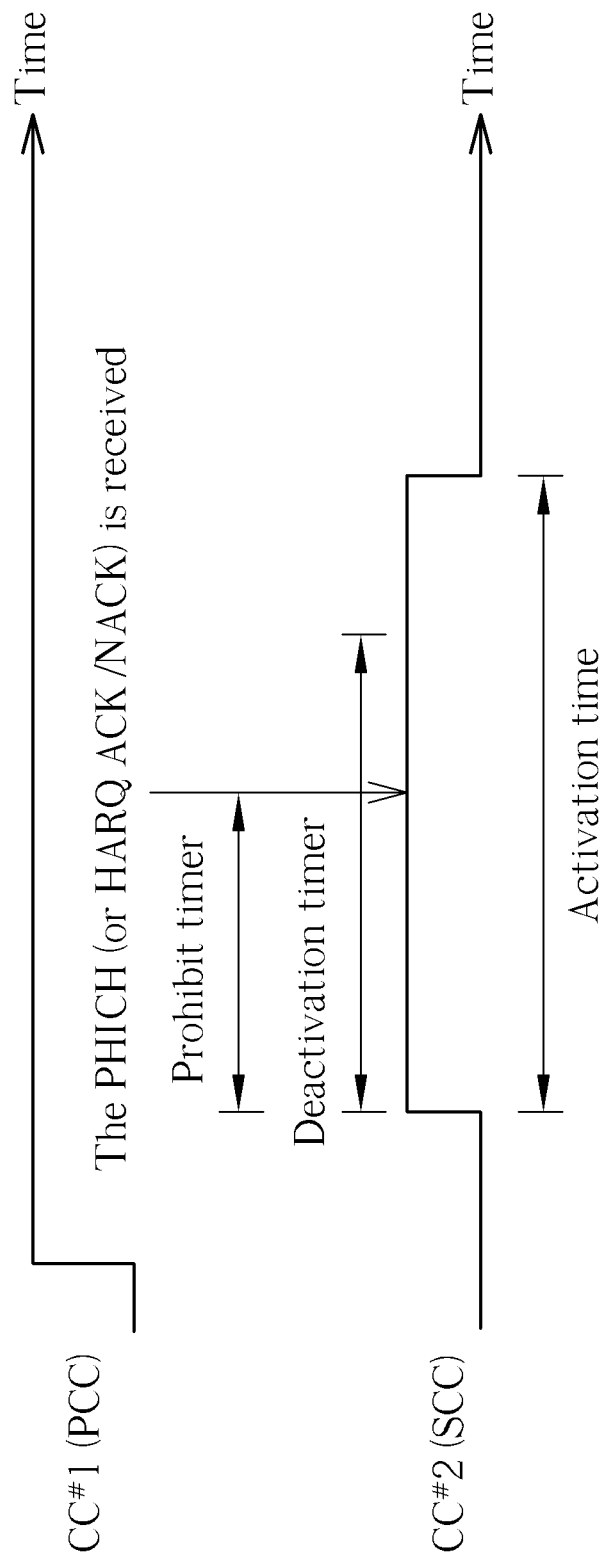

Please note that, in order to prevent redundant timer start or restart, a prohibit timer is provided. Please refer to FIG. 5(C), which is an activation-deactivation time diagram according to a third embodiment. The UE may start a prohibit timer when the deactivation timer is started. During duration of the prohibit timer, the UE does not restart/start the deactivation timer/extension timer T1 to extend activation time of the component carrier cc#2 (e.g. when the PHICH is received), so as to avoid redundant timer start or restart. Conversely, the UE may extend activation time of the component carrier cc#2 by restarting/starting the deactivation timer/extension timer T1 when the prohibit timer expires and the PHICH is received.

Figure 6A:
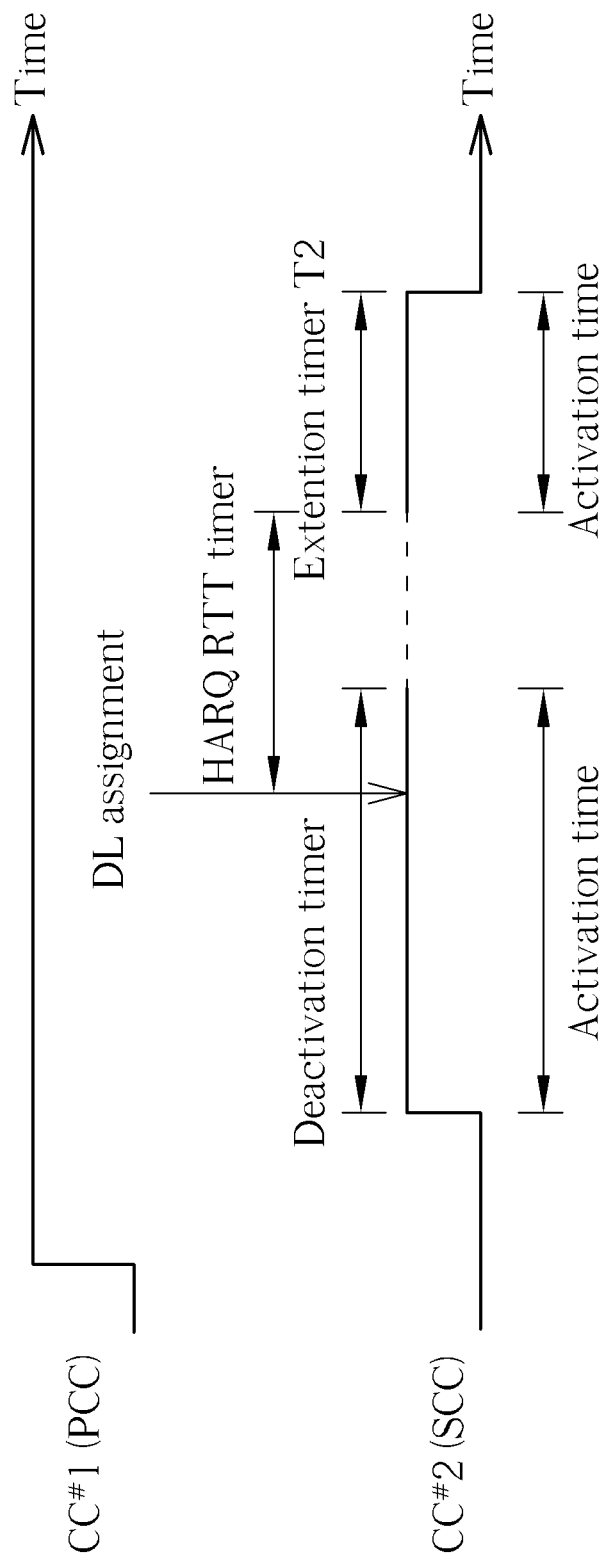
FIG. 6(A)-6(D) are component carrier activation-deactivation time diagrams according to different embodiments.

For downlink transmission, please refer to FIG. 6(A), which is an activation-deactivation time diagram according to a fourth embodiment. The UE receives PDCCH/PDSCH indicating a downlink transmission or a downlink assignment on the component carrier cc#2 during the duration of the deactivation timer, and thereby starts a HARQ round trip time (RTT) timer. During duration of the HARQ RTT timer, a downlink HARQ process retransmission is not expected by the UE. In other words, the UE may not receive the downlink HARQ process retransmission before expiry of the HARQ RTT timer. However, the component carrier may be deactivated (e.g. due to due to receiving the component carrier deactivation message or expiry of the deactivation timer) during the duration of the HARQ RTT timer. Therefore, the UE cannot receive the downlink HARQ process retransmission after HARQ RTT timer expires. In this situation, the UE may start the extension timer T2 for the component carrier cc#2 for extending activation time of the component carrier cc#2 when the HARQ RTT timer expires, and thereby can receive the downlink HARQ process retransmission during the duration of the extension timer T2, after HARQ RTT timer expires, so as to finish the downlink HARQ process retransmission.

Figure 6B:
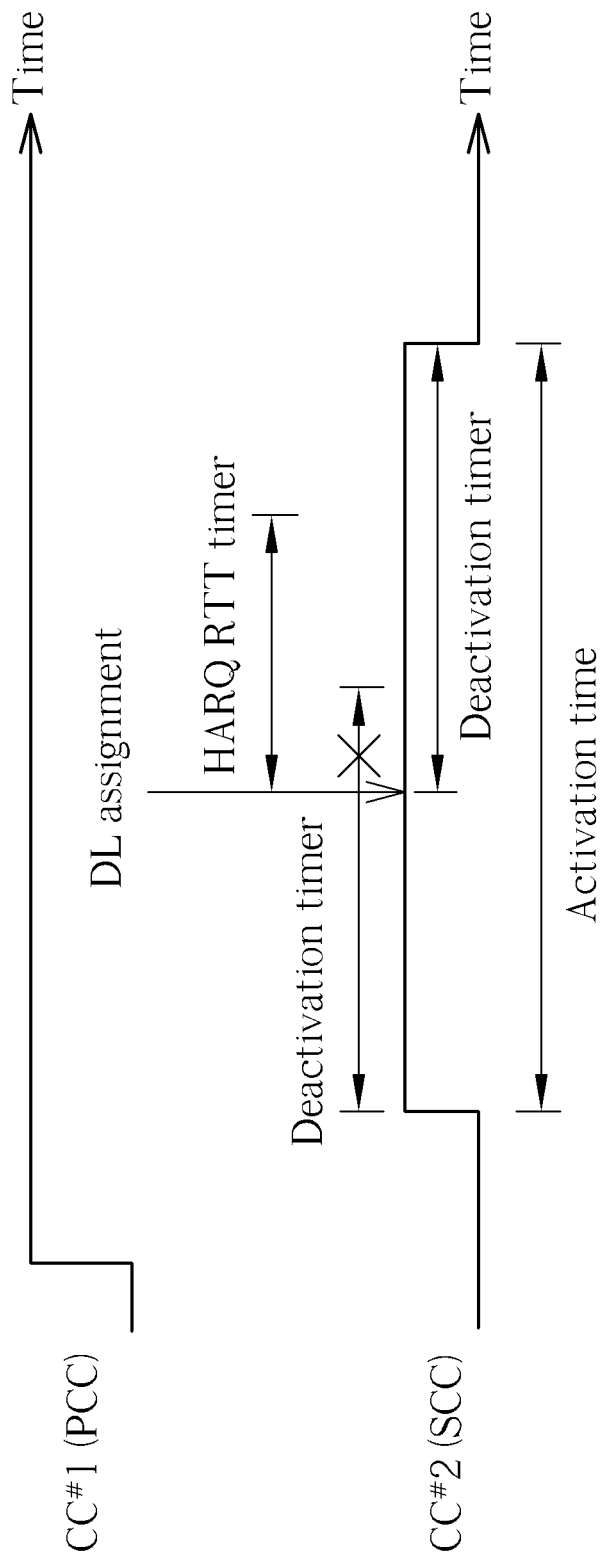
Figure 6C:
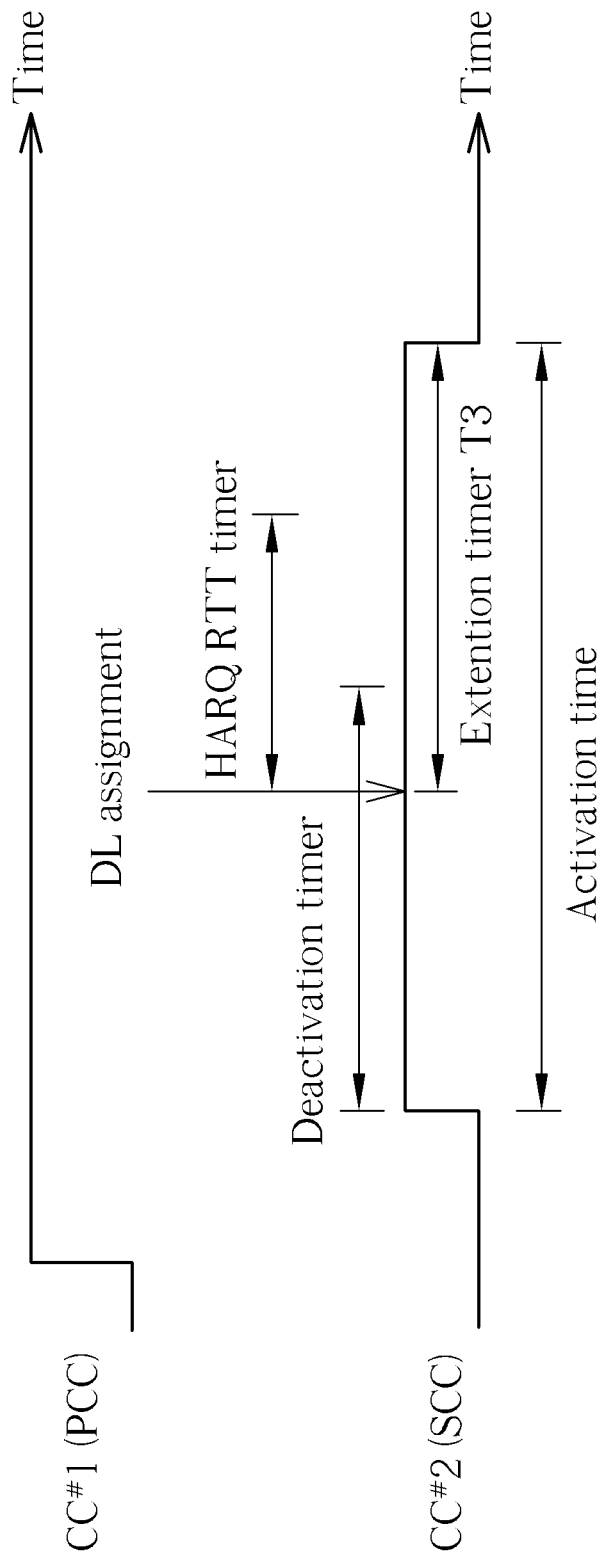
Figure 6D:
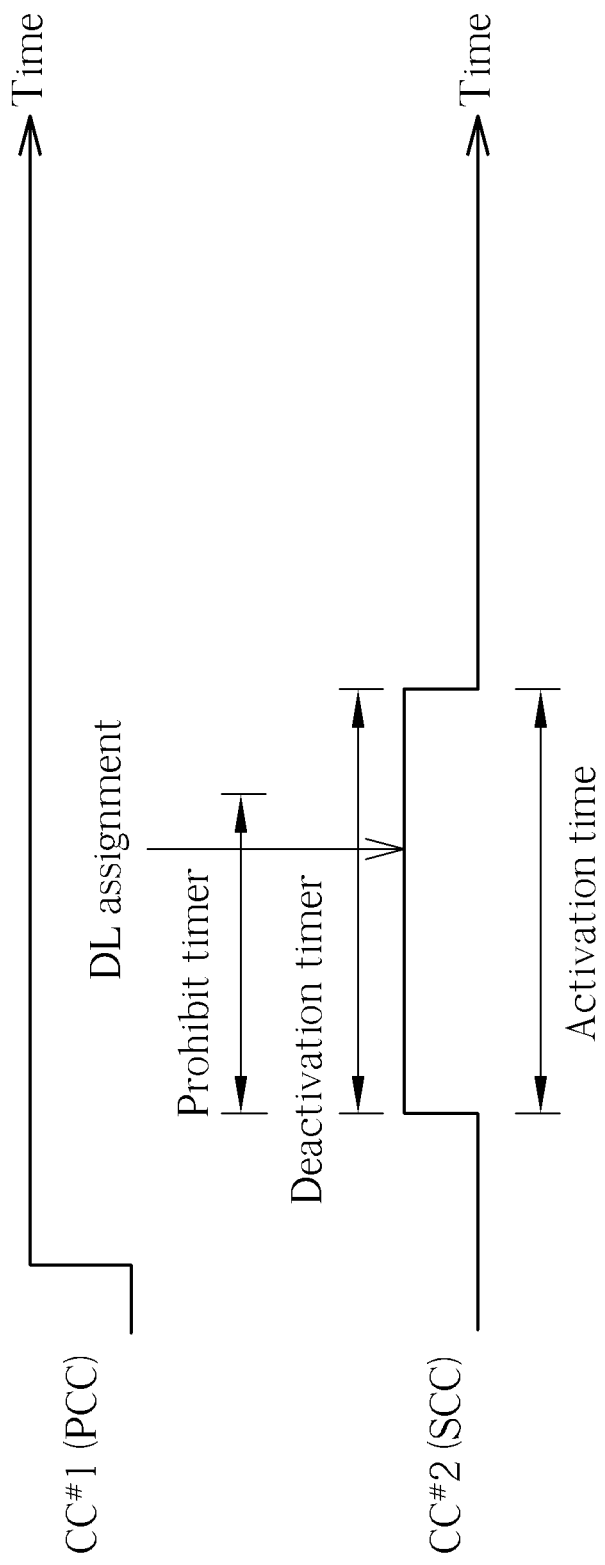

On the other hand, the UE may restart the deactivation timer for extending activation time of the component carrier cc#2 when the HARQ RTT timer is started/stopped in FIG. 6(B). Or, the UE may start the extension timer T3 for extending activation time of the component carrier cc#2 when the HARQ RTT timer is started/stopped in FIG. 6(C). In addition, the UE may start the prohibit timer to avoid redundant timer start or restart when the deactivation timer is started in FIG. 6(D). The UE does not start or restart the extension timer T2 or T3 or the deactivation timer before expiry of the prohibit timer, so as to avoid redundant timer start or restart.

The process 40 clearly specifies how to finish the HARQ process retransmission if the HARQ process retransmission is not finished before deactivation of the component carrier. The UE extends activation time of the component carrier, so as to complete the HARQ process retransmission.

Figure 7:
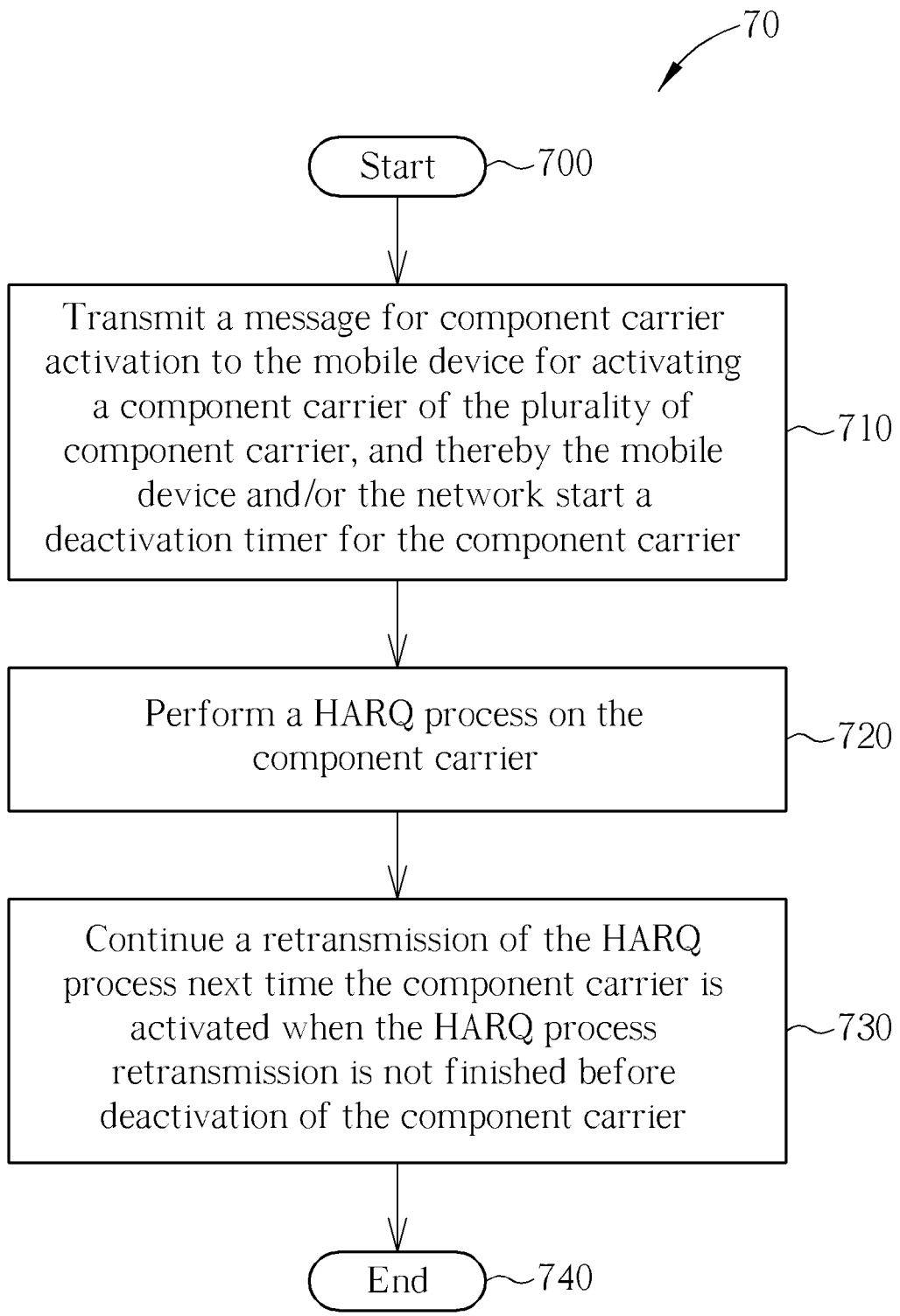
FIG. 7 is a flowchart of an exemplary process.

Please refer to FIG. 7, which illustrates a flowchart of an exemplary process 70. The process 70 is utilized in a network for handling component carrier activation and deactivation, and can be compiled into the program code 214 and includes the following steps:

Step 700: Start.

Step 710: Transmit a message for component carrier activation to the mobile device for activating a component carrier of the plurality of component carrier, and thereby the mobile device and/or the network start a deactivation timer for the component carrier.

Step 720: Perform a HARQ process on the component carrier.

Step 730: Continue a retransmission of the HARQ process next time the component carrier is activated when the HARQ process retransmission is not finished before deactivation of the component carrier.

Step 740: End.

According to the process 70, when the HARQ process retransmission is not finished before deactivation of the component carrier, the network may hold the HARQ process retransmission, and then performs the HARQ process retransmission next time the component carrier is activated, so as to finish the HARQ process retransmission.

Figure 8:
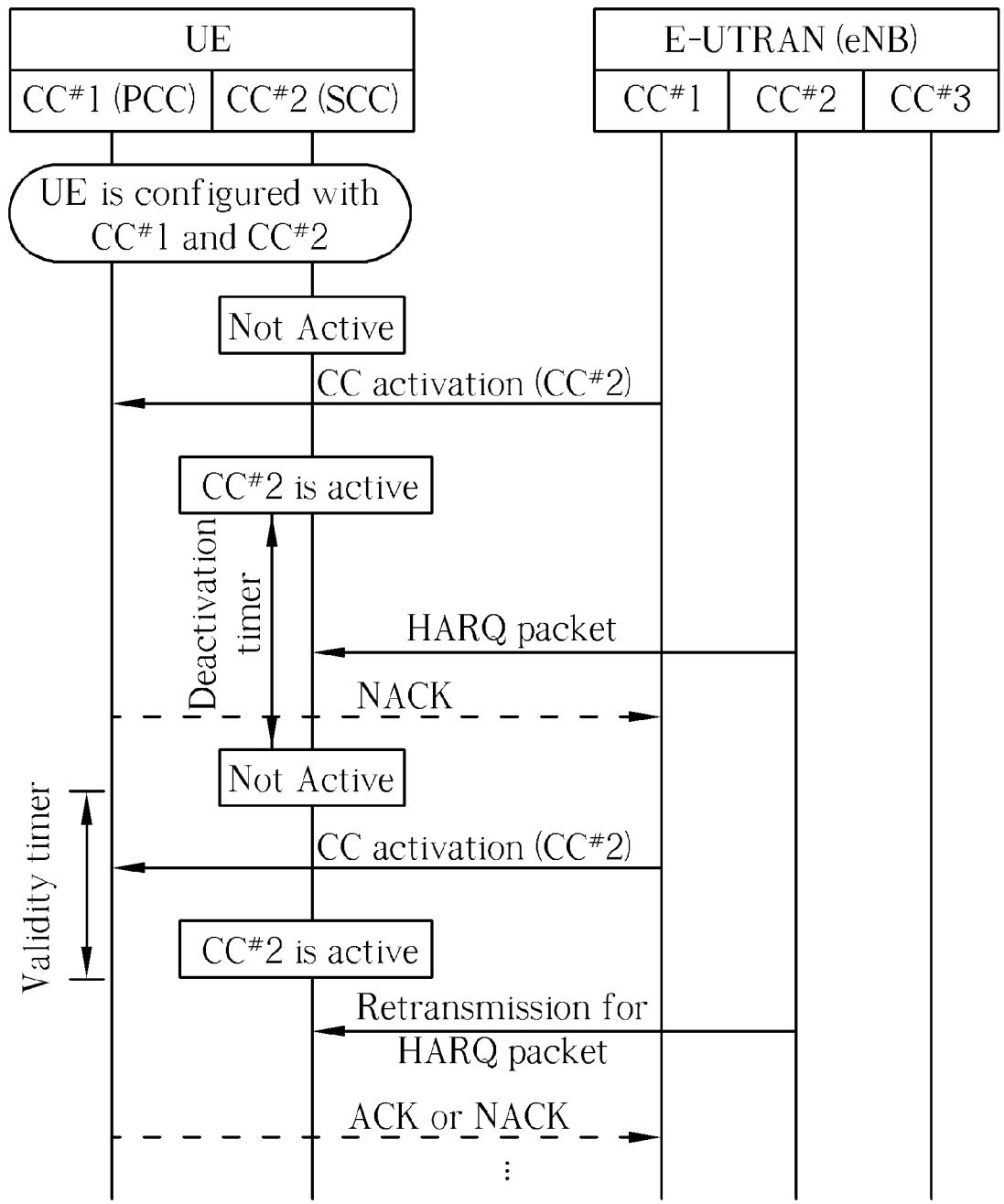
FIG. 8 is a transmission sequence diagram according to an embodiment.

Take an example based on the process 70. Please refer to FIG. 8, which is a transmission sequence diagram according to an embodiment. The network transmits the component carrier activation message to the UE, and thereby the UE activates the component carrier cc#2 and starts the deactivation timer. The network transmits a HARQ packet to the UE, and then receives the HARQ feedback (e.g. HARQ NACK) from the UE. However, the HARQ process retransmission is not finished when the deactivation timer expires, and the UE deactivates the component carrier cc#2. In other words, the UE deactivates the component carrier cc#2 when the HARQ process is on-going. In this situation, the network and/or the UE may hold the HARQ process retransmission, and continue the HARQ retransmission when the component carrier cc#2 is activated again, so as to finish the HARQ process retransmission.

Moreover, the UE may start a validity timer for the component carrier cc#2 when the component carrier cc#2 is deactivated. The network continues the HARQ process retransmission if the component carrier cc#2 is reactivated before the validity timer expires. Otherwise, the network and/or UE may not continue the HARQ process retransmission, so as to maintain validity of data in a HARQ buffer corresponding to the HARQ process.

The process 70 clearly specifies how to finish the HARQ process retransmission if the HARQ retransmission is not finished before deactivation of the component carrier. The network and/or UE may continue the HARQ process retransmission next time the component carrier is activated, so as to finish the HARQ process retransmission.

Figure 9:
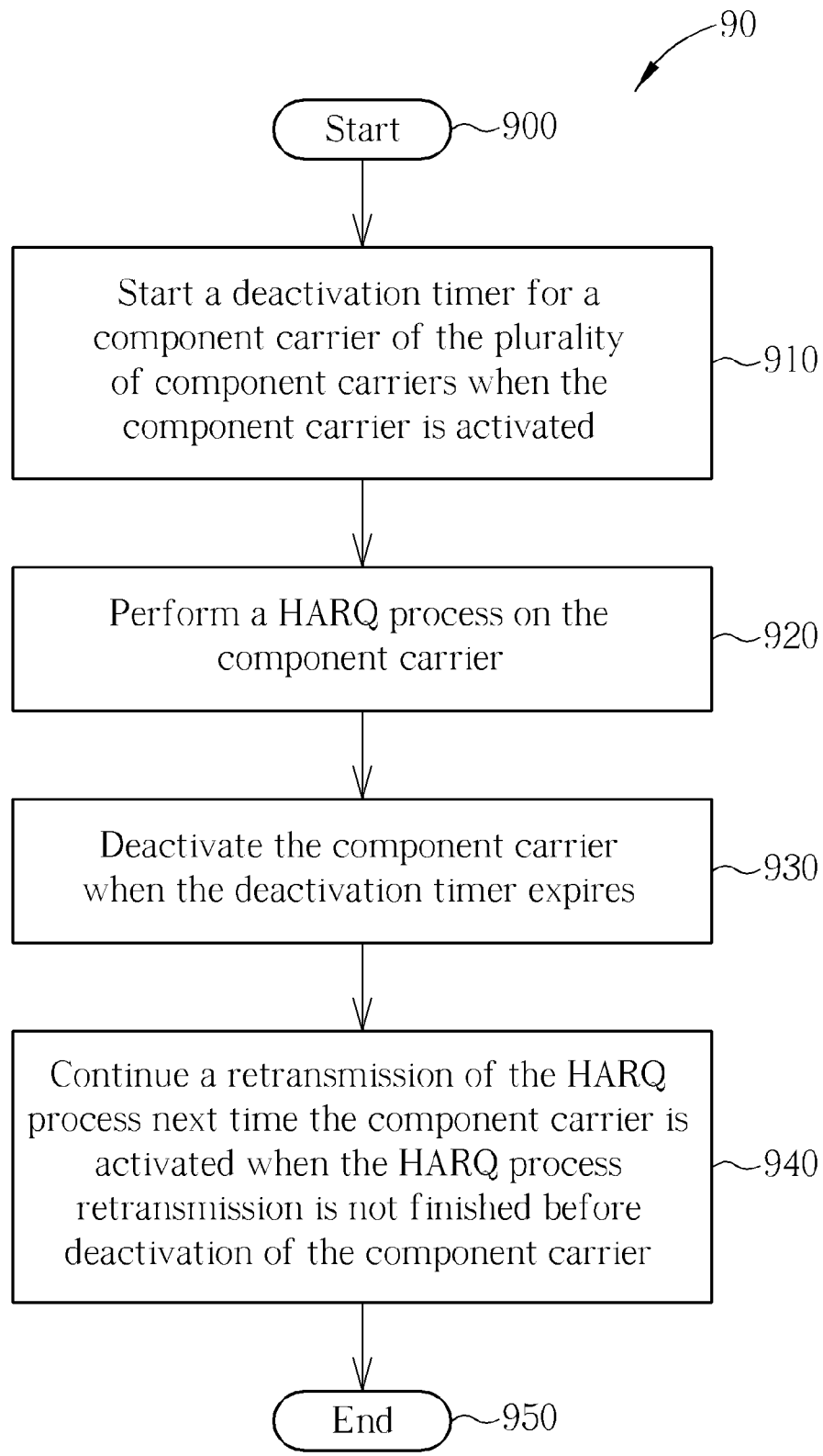
FIG. 9 is a flowchart of an exemplary process.

Please refer to FIG. 9, which illustrates a flowchart of an exemplary process 90. The process 90 is utilized in an UE, as the mobile device 10 of FIG. 1, capable of communicating with a network through a plurality of component carriers, for handling component carrier activation and deactivation. The process 90 can be compiled into the program code 214 and includes the following steps:

Step 900: Start.

Step 910: Start a deactivation timer for a component carrier of the plurality of component carriers when the component carrier is activated.

Step 920: Perform a HARQ process on the component carrier.

Step 930: Deactivate the component carrier when the deactivation timer expires.

Step 940: Continue a retransmission of the HARQ process next time the component carrier is activated when the HARQ process retransmission is not finished before deactivation of the component carrier.

Step 950: End.

According to the process 90, when the deactivation timer expires, the UE deactivates the component carrier even if the HARQ process on the component carrier is on-going, and continues the HARQ process retransmission next time the component carrier is activated, so as to finish the HARQ process retransmission.

The process 90 clearly specifies how to finish the HARQ process retransmission if the HARQ process retransmission is not finished before deactivation of the component carrier (e.g. due to receiving a deactivation command or expiry of the deactivation timer). The UE continues the HARQ process retransmission next time the component carrier is activated, so as to complete the HARQ retransmission. Moreover, the UE starts a timer when the component carrier is deactivated, and continues the HARQ process retransmission if the component carrier is reactivated before expiry of the timer. The detailed description can be referred from above, so it is not given herein.

Figure 10:
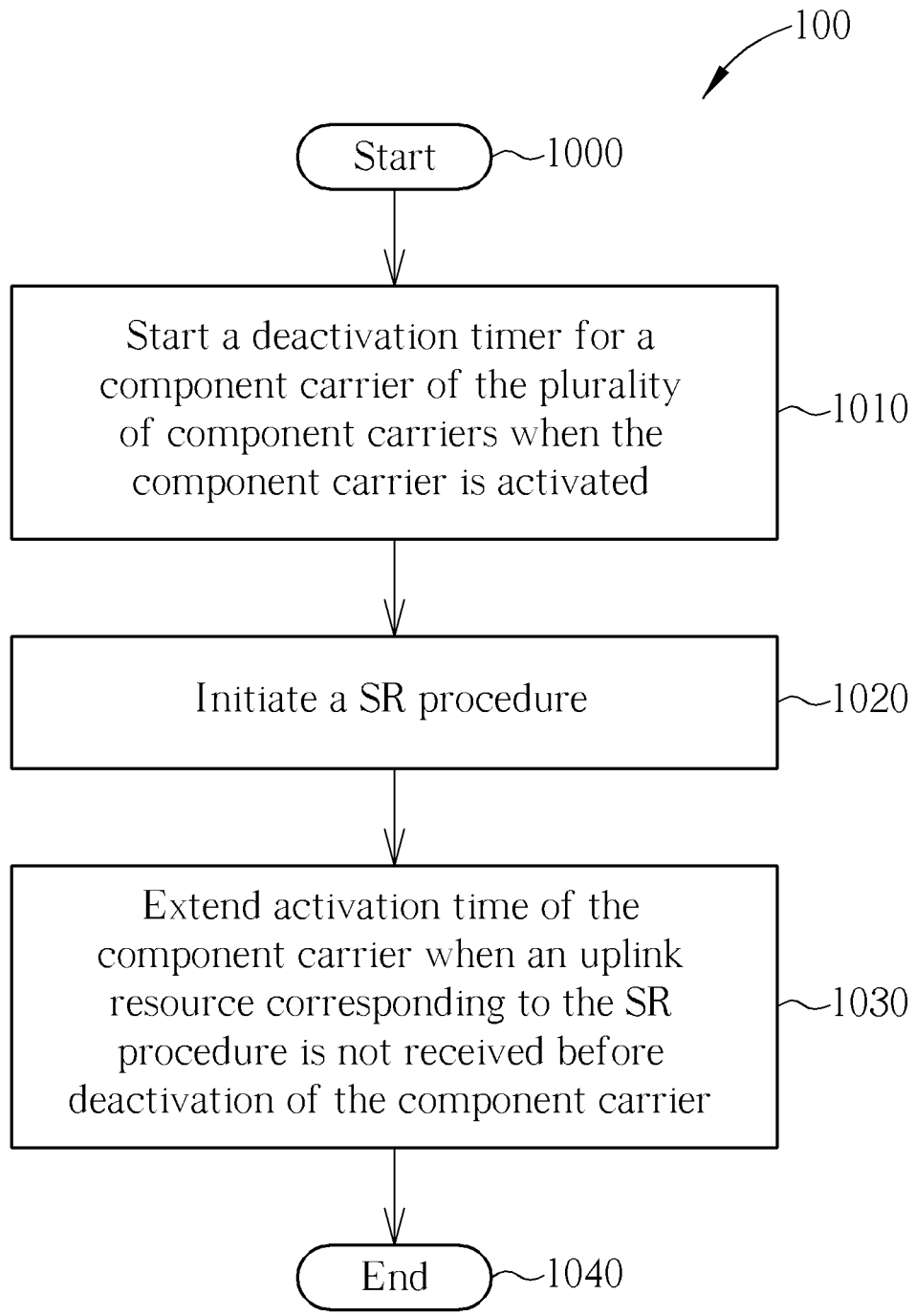
FIG. 10 is a flowchart of exemplary processes.

Please refer to FIG. 10, which illustrates a flowchart of an exemplary process 100. The process 100 is utilized in an UE capable of communicating with a network through a plurality of component carriers for handling component carrier activation and deactivation. The process 100 can be compiled into the program code 214 and includes the following steps:

Step 1000: Start.

Step 1010: Start a deactivation timer for a component carrier of the plurality of component carriers when the component carrier is activated.

Step 1020: Initiate a SR procedure.

Step 1030: Extend activation time of the component carrier when an uplink resource corresponding to the SR procedure is not received before deactivation of the component carrier.

Step 1040: End.

According to the process 100, the UE initiates the SR procedure for requesting the uplink resource from a new transmission, and may keep the component carrier activated if the uplink resource is not received before deactivation of the component carrier (e.g. due to receiving a deactivation command or the deactivation timer expires), so as to receive the uplink resource.

Figure 11:
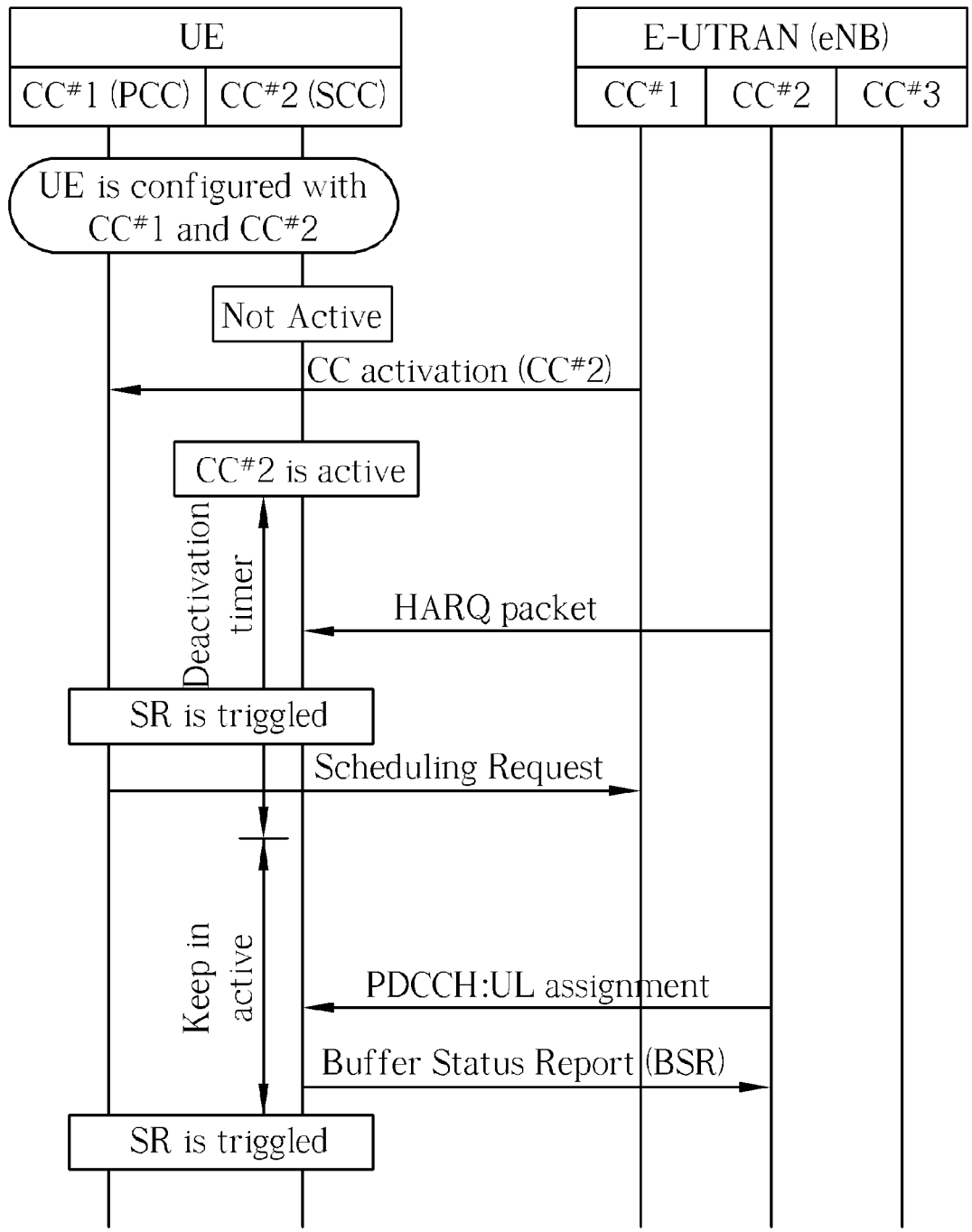
FIG. 11 is a transmission sequence diagram according to an embodiment.

Take an example based on the process 100. Please refer to FIG. 11, which is a transmission sequence diagram according to an embodiment. The UE initiates the SR procedure, and transmits a scheduling request message to the network through the component carrier cc#1. Note that, the uplink resource may be allocated on component carrier cc#1 or cc#2 by the PDCCH. However, the UE does not receive the uplink resource before deactivation of the component carrier (e.g. due to receiving a deactivation command or expiry of the deactivation timer), and considers the SR procedure as pending. In this situation, the UE extends the activation time of the component carrier cc#2 to receive the uplink resource for transmission. That is, the UE keeps the component carrier cc#2 activated for uplink resource reception. The UE may restart/start the deactivation timer/extension timer for extending activation time of the component carrier cc#2, and thereby the uplink resource may be received on the component carrier cc#2 during the extended activation time. The detailed description for the deactivation timer/extension timer can be referred from above, so it is not given herein. Moreover, the UE may use the uplink resource to transmit a buffer status report (BSR) to the network. After that, the SR procedure may be cancelled.

The process 100 clearly specifies how to handle the situation that the uplink resource corresponding to the SR procedure is not received before deactivation of the component carrier. The UE extends activation time of the component carrier to receive the uplink resource, so as to perform a new transmission.

Figure 12:
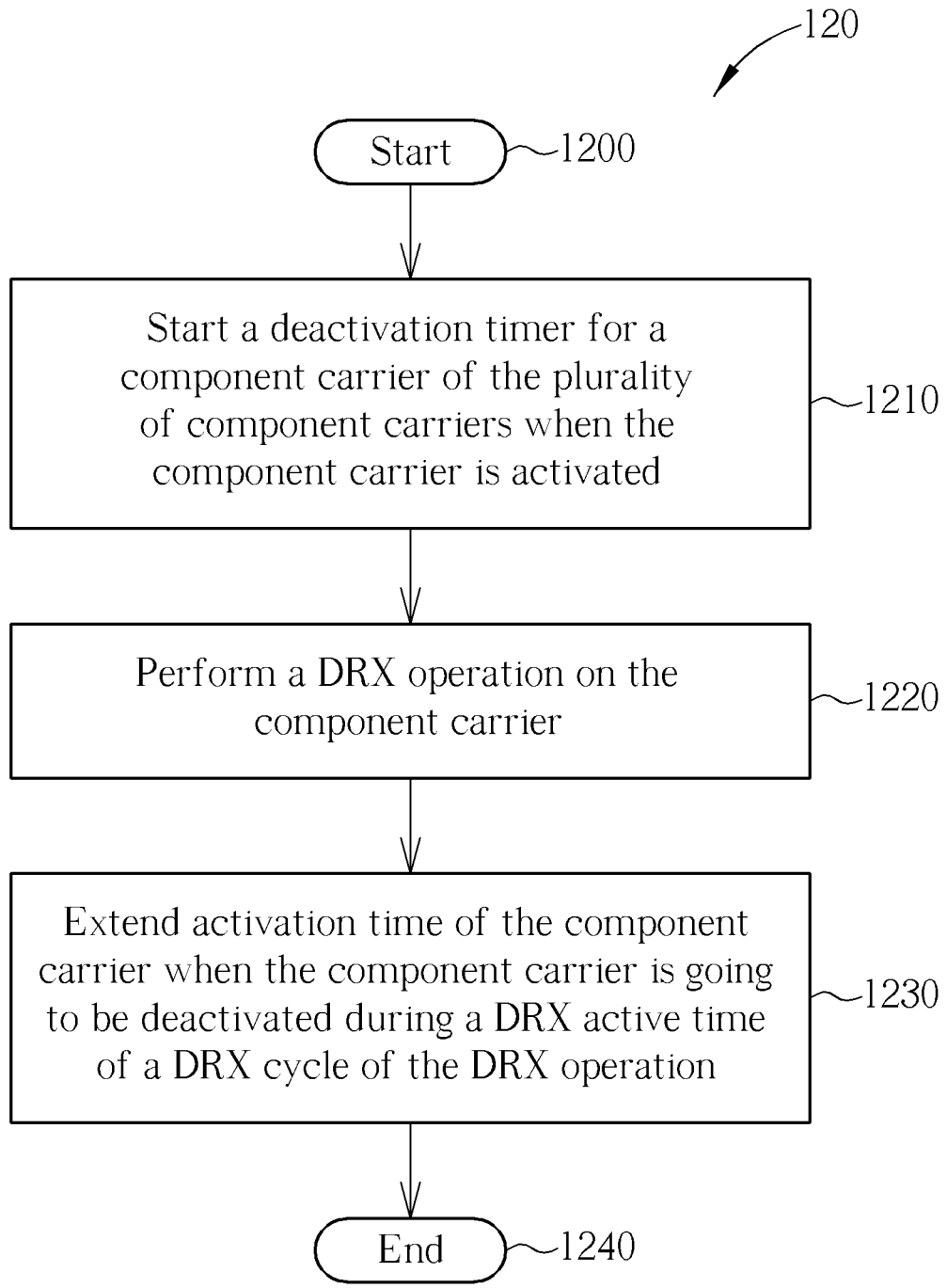
FIG. 12 is a flowchart of exemplary processes.

Please refer to FIG. 12, which illustrates a flowchart of an exemplary process 120. The process 120 is utilized in a UE (e.g. the mobile device 10 of FIG. 1) and/or a network for handling component carrier activation and deactivation. The process 120 can be compiled into the program code 214 and includes the following steps:

Step 1200: Start.

Step 1210: Start a deactivation timer for a component carrier of the plurality of component carriers when the component carrier is activated.

Step 1220: Perform a DRX operation on the component carrier.

Step 1230: Extend activation time of the component carrier when the component carrier is going to be deactivated during a DRX active time of a DRX cycle of the DRX operation.

Step 1240: End.

According to the process 120, the UE performs the DRX operation on the activated component carrier, and keeps the component carrier activated when the component carrier is going to be deactivated during the DRX active time of the DRX cycle of the DRX operation configured to monitor the PDCCH, so as to require a full DRX activate time for PDCCH monitoring.

Figure 13:
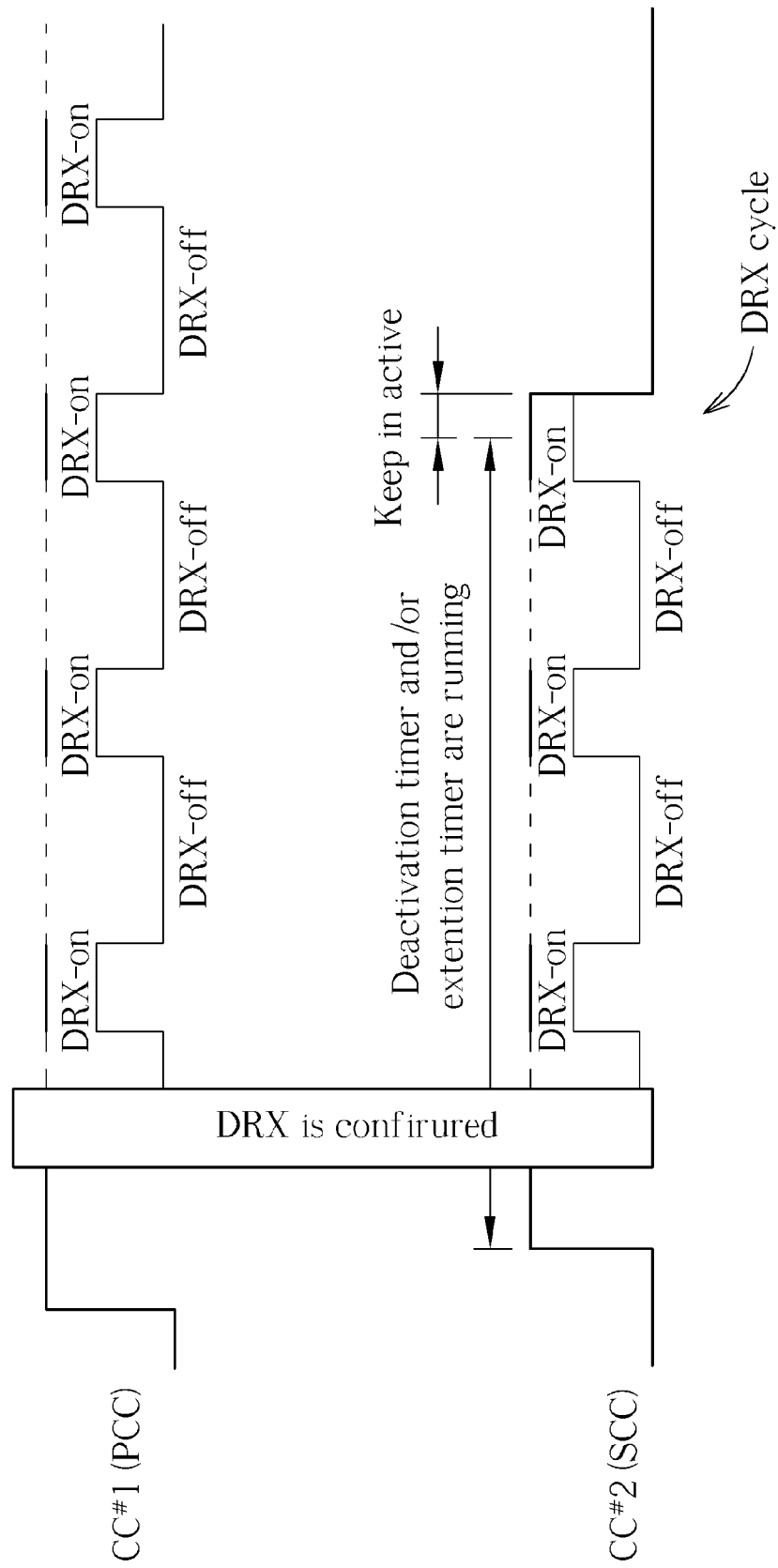
FIG. 13 illustrates a schematic diagram of component carrier activation-deactivation time with a discontinuous reception operation.

Take an example based on the process 120. Please refer to FIG. 13, which illustrates a schematic diagram of component carrier activation-deactivation time with a discontinuous reception (DRX) operation. The UE initiates the DRX configuration when a DRX configuration is received. The component carrier cc#1 and cc#2 may share the same DRX configuration, and thereby have the same DRX active time and DRX inactive time (represented by DRX-on and DRX-off in FIG. 13). However, the component carrier may be deactivated (e.g. UE may receive a command to deactivate the component carrier, or deactivation timer (or the abovementioned extension timer) may expire) during the DRX active time. In this situation, the UE extends activation time of the component carrier cc#2. More specifically, the UE keeps the component carrier activated until the end of the DRX active time, avoiding decrease of the time of PDCCH monitoring. A way for extending activation time of the component carrier cc#2 can be referred from above, such as the extension timer, so it is not given herein. In addition, the UE deactivates the component carrier cc#2 after the end of the DRX active time.

The process 120 clearly specifies how to handle the situation that the component carrier is going to be deactivated during the DRX active time for PDCCH monitoring. The UE extends activation time of the component carrier to complete a period of the DRX cycle for PDCCH monitoring (namely the DRX active time).

Figure 14:
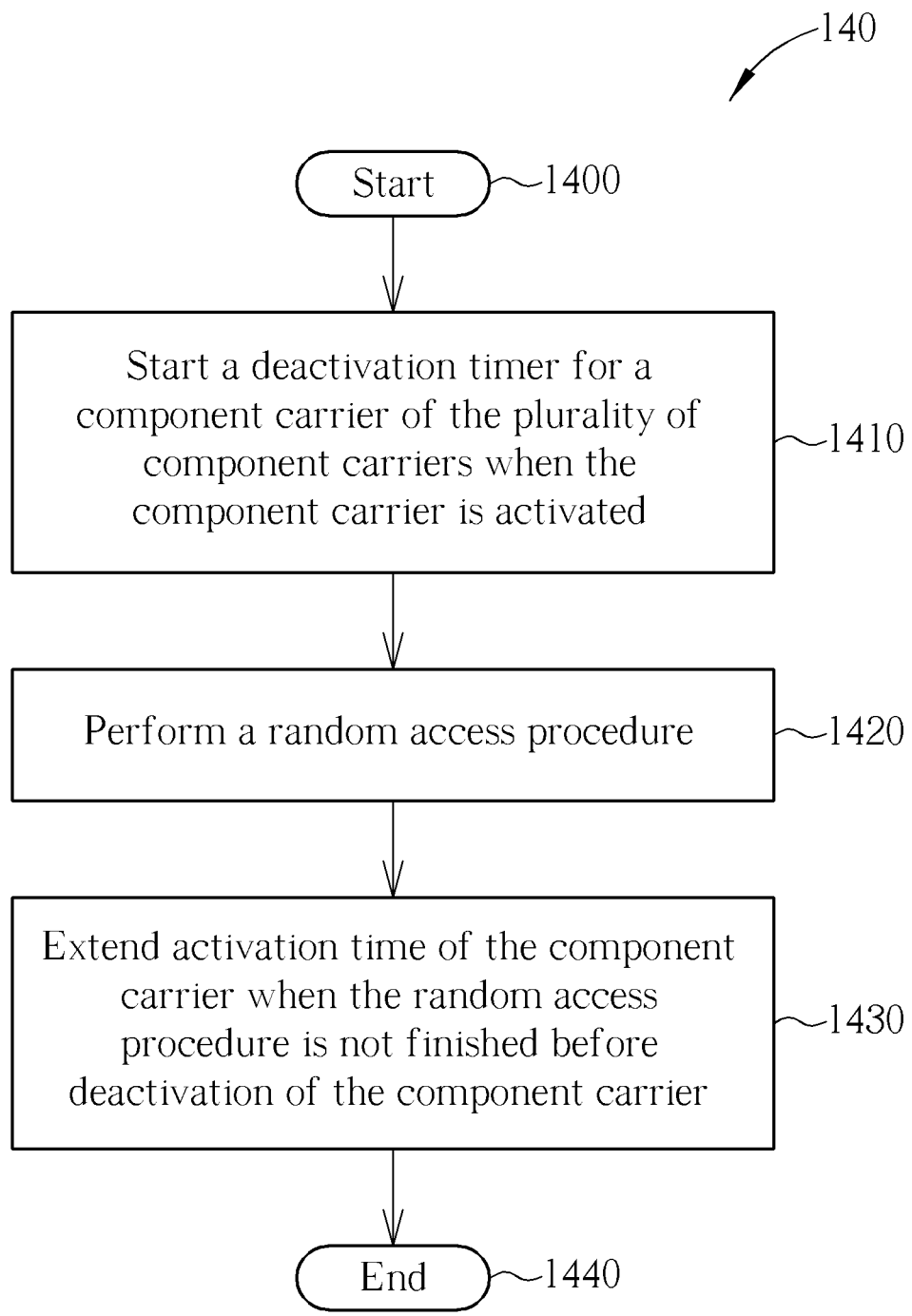
FIG. 14 is a flowchart of exemplary processes.

Please refer to FIG. 14, which illustrates a flowchart of an exemplary process 140. The process 140 is utilized in a UE capable of communicating with a network through a plurality of component carriers for handling component carrier activation and deactivation. The process 140 can be compiled into the program code 214 and includes the following steps:

Step 1400: Start.

Step 1410: Start a deactivation timer for a component carrier of the plurality of component carriers when the component carrier is activated Step 1420: Perform a random access procedure.

Step 1430: Extend activation time of the component carrier when the random access procedure is not finished before deactivation of the component carrier.

Step 1440: End.

According to the process 140, the UE performs the random access procedure (e.g. a contention based random access procedure or a non-contention based random access procedure), and keeps the component carrier activated if the random access procedure is not completed, so as to complete the random access procedure.

Figure 15:
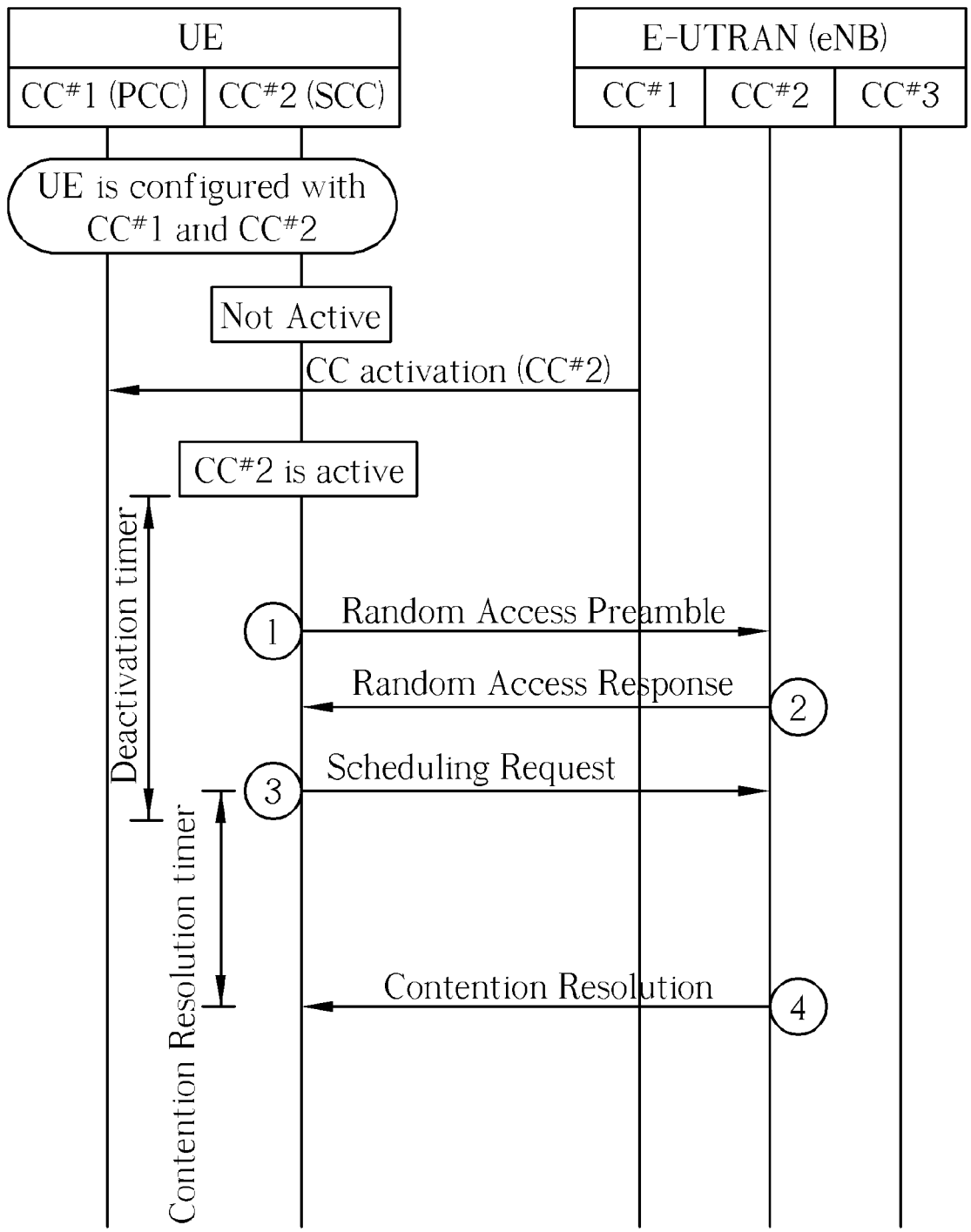
FIG. 15-16 illustrate schematic diagrams of contention based random access procedures.

Take an example based on the process 140. Please refer to FIG. 15, which illustrates a schematic diagram of a contention based random access procedure. The UE performs the contention based random access on the component carrier cc#2, and transmits a scheduled transmission message including UE identity of the contention based random access procedure to the network (e.g. the eNB). However, the UE does not receive a contention resolution message of the contention based random access procedure before expiry of the deactivation timer of the component carrier cc#2. In this situation, the UE may extend activation time of the component carrier cc#2 by starting a contention resolution timer for the component carrier cc#2. The contention resolution timer means the number of consecutive subframes which the UE can monitor the PDCCH for reception of the contention resolution message after transmitting the Scheduled Transmission message. On the other hand, the UE may extend activation time of the component carrier cc#2 by starting/restarting the abovementioned extension timer/deactivation timer.

Figure 16:
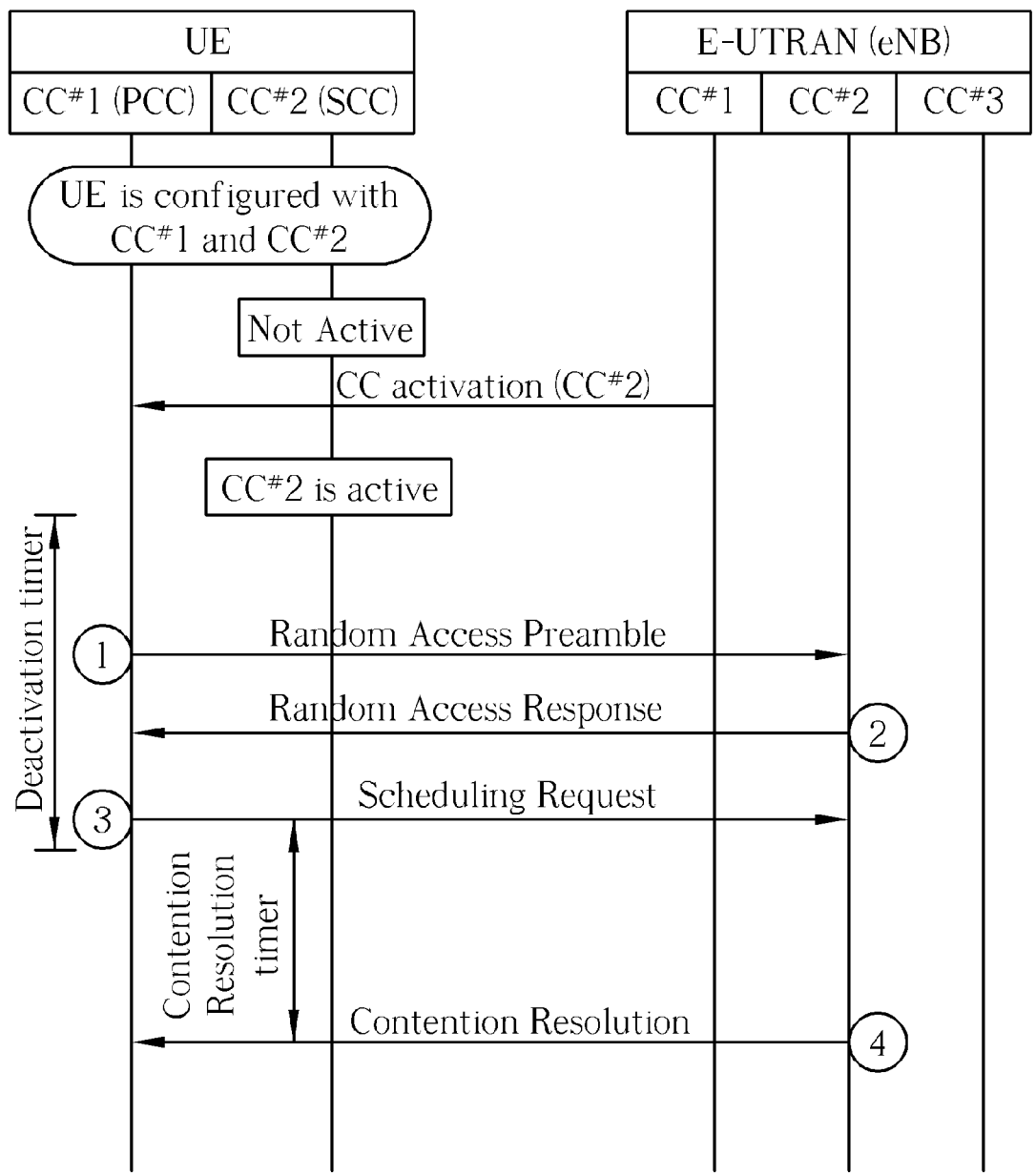

In addition, please refer to FIG. 16. As can be seen, the contention based random access may be performed on the component carrier cc#1, but not on the component carrier cc#2. However, the contention resolution message may be transmitted on any of the activated component carrier (e.g. the component carrier cc#2). Therefore, if the UE does not receive the contention resolution message before deactivation of the component carrier cc#2, the UE may extend activation time of the component carrier cc#2 by starting/restarting the contention resolution timer/extension timer/deactivation timer, so as to receive the contention resolution message to complete the contention based random access procedure.

Figure 17:
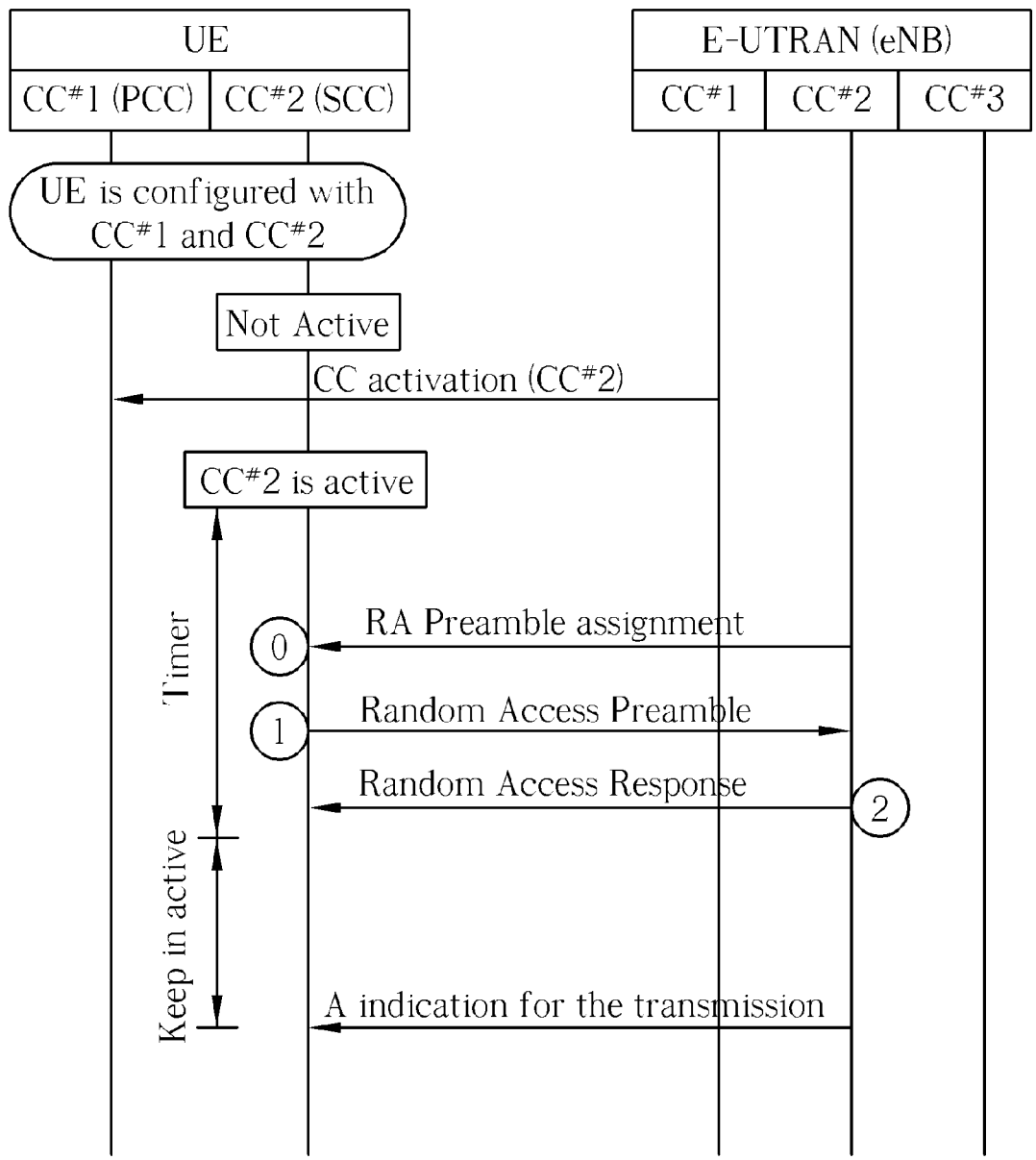
FIG. 17-18 illustrate schematic diagrams of non-contention based random access procedures.

Instead of contention based random access procedure, the process 140 can be applied in non-contention based random access procedure. Please refer to FIG. 17, which illustrates a schematic diagram of a non-contention based random access procedure. The UE performs the non-contention based random access procedure on the component carrier cc#2, and does not receive a random access response message of the non-contention based random access procedure before deactivation of the component carrier cc#2. In this situation, the UE keeps the component carrier cc#2 activated via restarting/starting the contention resolution timer/extension timer/deactivation timer. The detailed description can be referred from above, so it is omitted herein. In addition, the non-contention based random access procedure may be perform when a downlink/uplink data arrival. Thus, the UE may keep the component carrier cc#2 activated until the random access response message is received and/or a new transmission indication is received.

Figure 18:
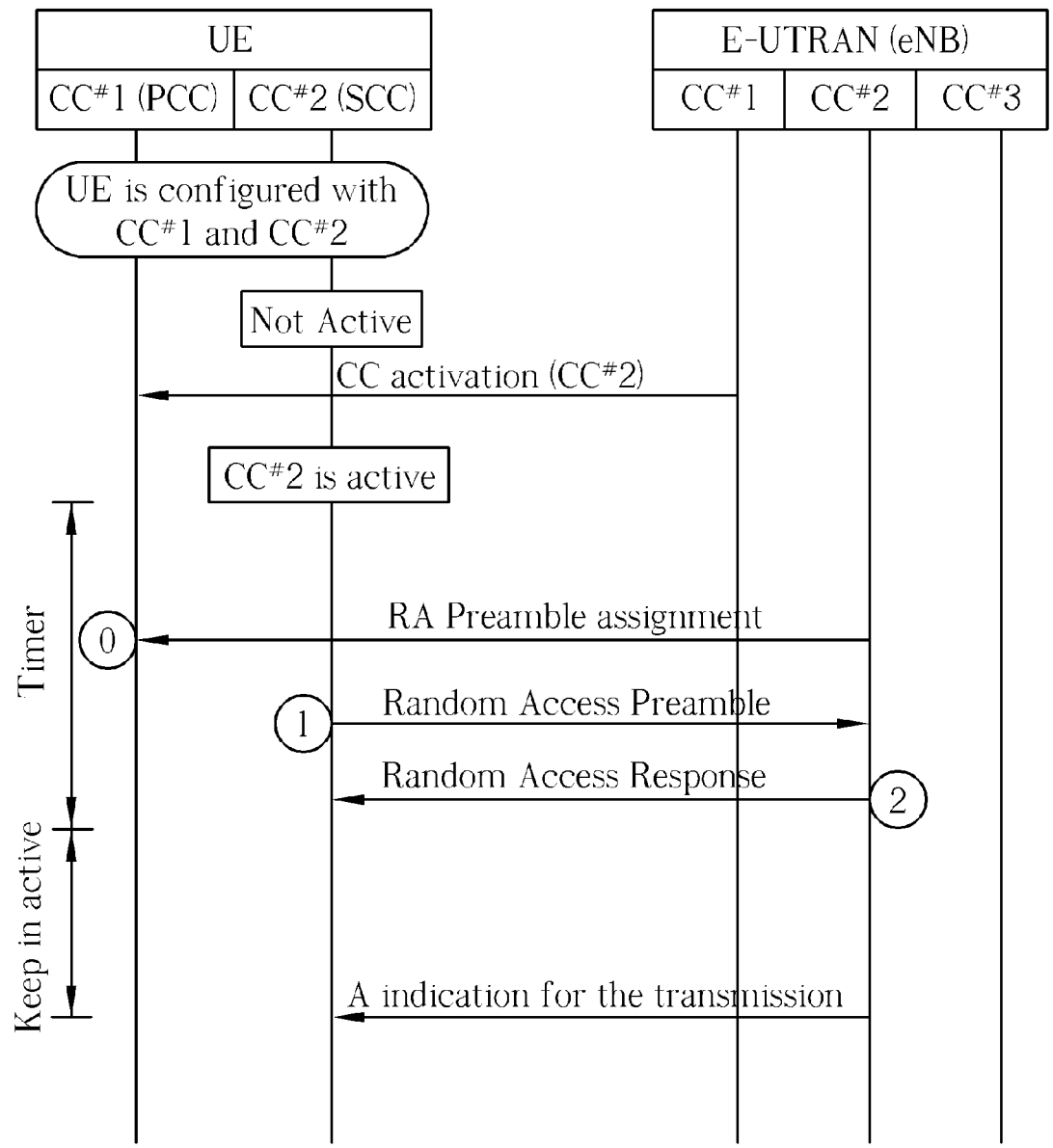

On the other hand, the non-contention based random access procedure may be performed on the component carrier cc#1 and/or cc#2. As can be seen in FIG. 18, the random access preamble assignment is transmitted on the component carrier cc#1, whereas a random access preamble message and the random access response message are transmitted on the component carrier cc#2. Therefore, the UE may extend activation time of the component carrier cc#2 even through the non-contention based random access procedure is running on other component carrier (e.g. the component carrier cc#1).

The process 140 clearly specifies how to handle the situation that the random access procedure is not finished before deactivation of the component carrier (e.g. due to receiving a deactivation command or expiry of the deactivation timer). The UE extends activation time of the component carrier, so as to complete the random access procedure.

Figure 19:
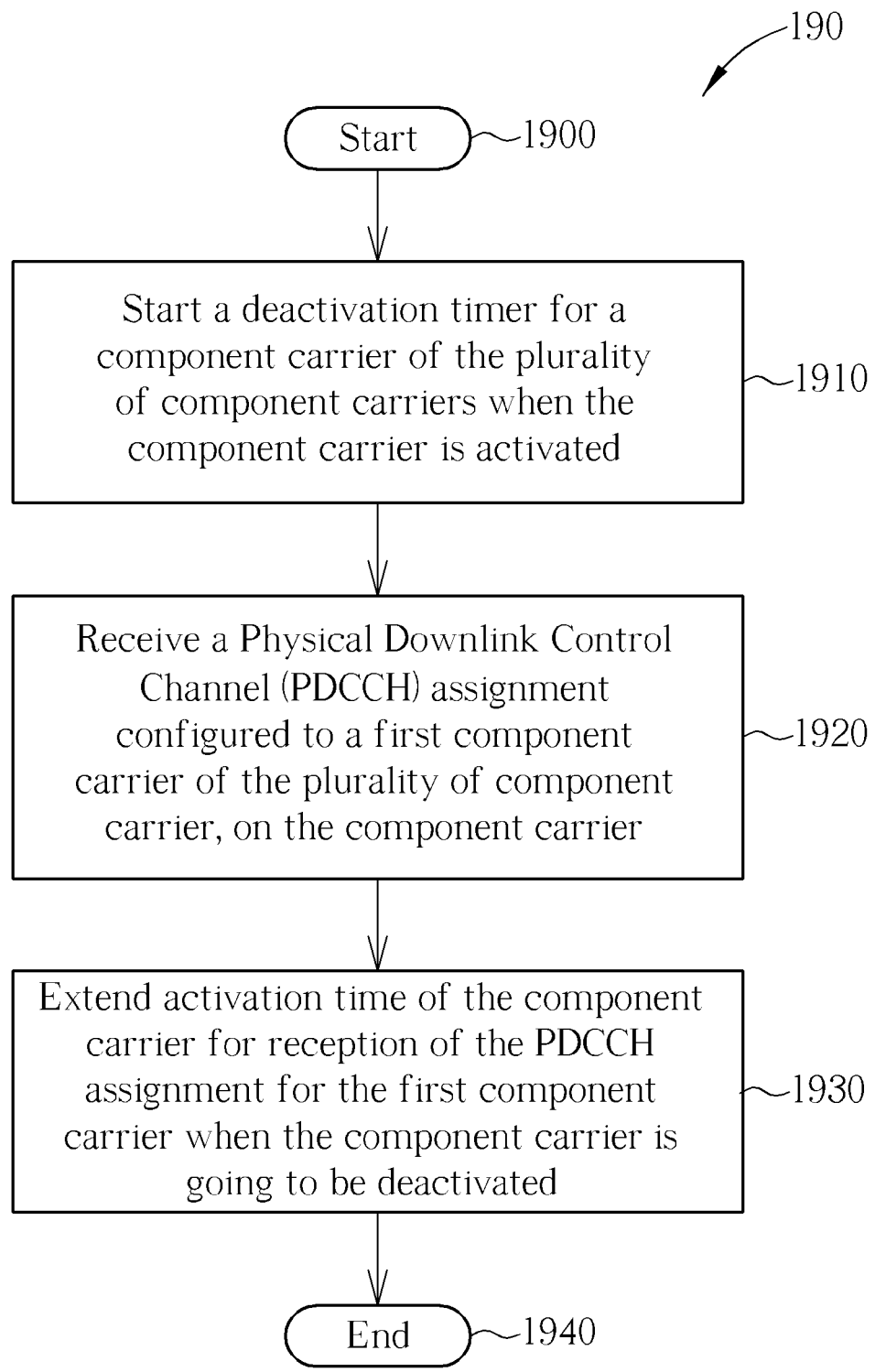
FIG. 19 is a flowchart of exemplary processes.

Please refer to FIG. 19, which illustrates a flowchart of an exemplary process 190. The process 190 is utilized in a UE and/or in a network for handling component carrier activation and deactivation. The process 190 can be compiled into the program code 214 and includes the following steps:

Step 1900: Start.

Step 1910: Start a deactivation timer for a component carrier of the plurality of component carriers when the component carrier is activated.

Step 1920: Receive a Physical Downlink Control Channel (PDCCH) assignment configured to a first component carrier of the plurality of component carrier, on the component carrier.

Step 1930: Extend activation time of the component carrier for reception of the PDCCH assignment for the first component carrier when the component carrier is going to be deactivated.

Step 1940: End.

According to the process 190, the UE receives PDCCH for a first component carrier on the component carrier (hereafter called cross component carrier scheduling). Note that, the first component carrier and the component carrier may be the same component carrier. The UE extends activation time of the component carrier receiving the PDCCH when the component carrier is going to be deactivated (e.g. due to receiving a deactivation command or the deactivation timer expires), so as to receive the PDCCH for the first component carrier.

Figure 20:
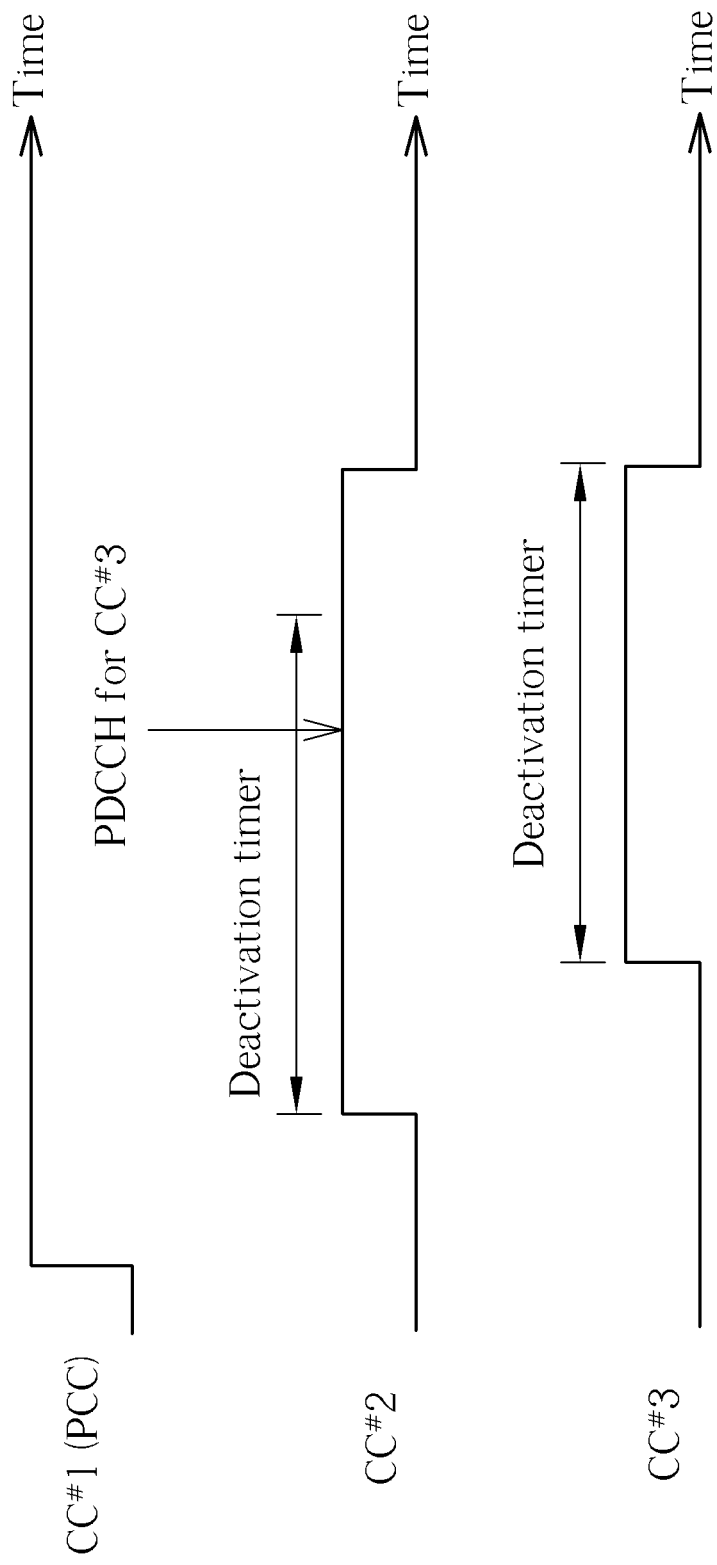
FIG. 20 is component carrier activation-deactivation time diagrams according to an embodiment.

Take an example based on the process 190. Please refer to FIG. 20, which is a component carrier activation-deactivation time diagram according to an embodiment. Assume the PDCCH for the component carrier cc#3 is transmitted on the component carrier cc#2. The UE shall keeps the component carrier cc#2 activated when the component carrier cc#2 is going to be deactivated (e.g. due to receiving a deactivation command or expiry of the deactivation timer), so as to receive the PDCCH for the component carrier cc#3. In addition, there are some methods for activation. In the first method, the UE keeps the component carrier cc#2 activated while the component carrier cc#3 is activated. In the second method, if the deactivation timer of the component carrier cc#3 is started or restarted, the UE starts or restarts the deactivation timer of the component carrier cc#2. In the third method, if the extension timer of the component carrier cc#3 is started or restarted, the UE starts or restarts the extension timer of the component carrier cc#2. On the other hand, the UE may start the prohibit timer whenever the deactivation timer/extension timer is started or restarted, and performs one of the abovementioned methods to extend the activation time.

Figure 21:
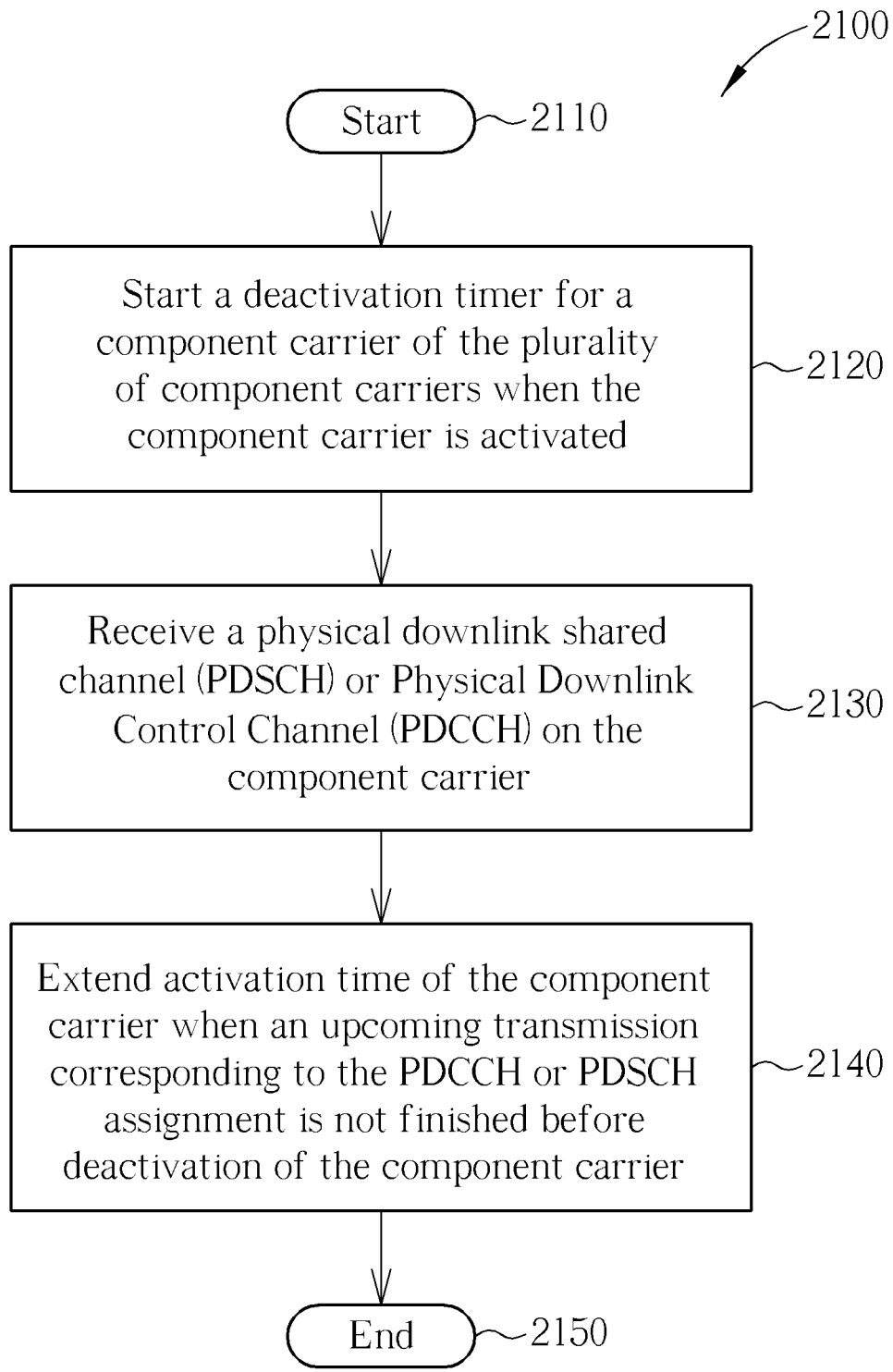
FIG. 21 is a flowchart of exemplary processes.

Please refer to FIG. 21, which illustrates a flowchart of an exemplary process 2100. The process 2100 is utilized in a UE and/or in a network for handling component carrier activation and deactivation. The process 210 can be compiled into the program code 214 and includes the following steps:

Step 2110: Start.

Step 2120: Start a deactivation timer for a component carrier of the plurality of component carriers when the component carrier is activated.

Step 2130: Receive a physical downlink shared channel (PDSCH) or Physical Downlink Control Channel (PDCCH) on the component carrier.

Step 2140: Extend activation time of the component carrier when an upcoming transmission corresponding to the PDCCH or PDSCH assignment is not finished before deactivation of the component carrier.

Step 2150: End.

According to the process 2100, when the UE receives the PDCCH/PDSCH on the component carrier, which indicates an upcoming transmission. Therefore, the UE shall extend activation time of the component carrier if the upcoming transmission is not finished before deactivation of the component carrier (e.g. due to receiving a deactivation command or the deactivation timer expires), so as to finish the data transmission.

Figure 22A:
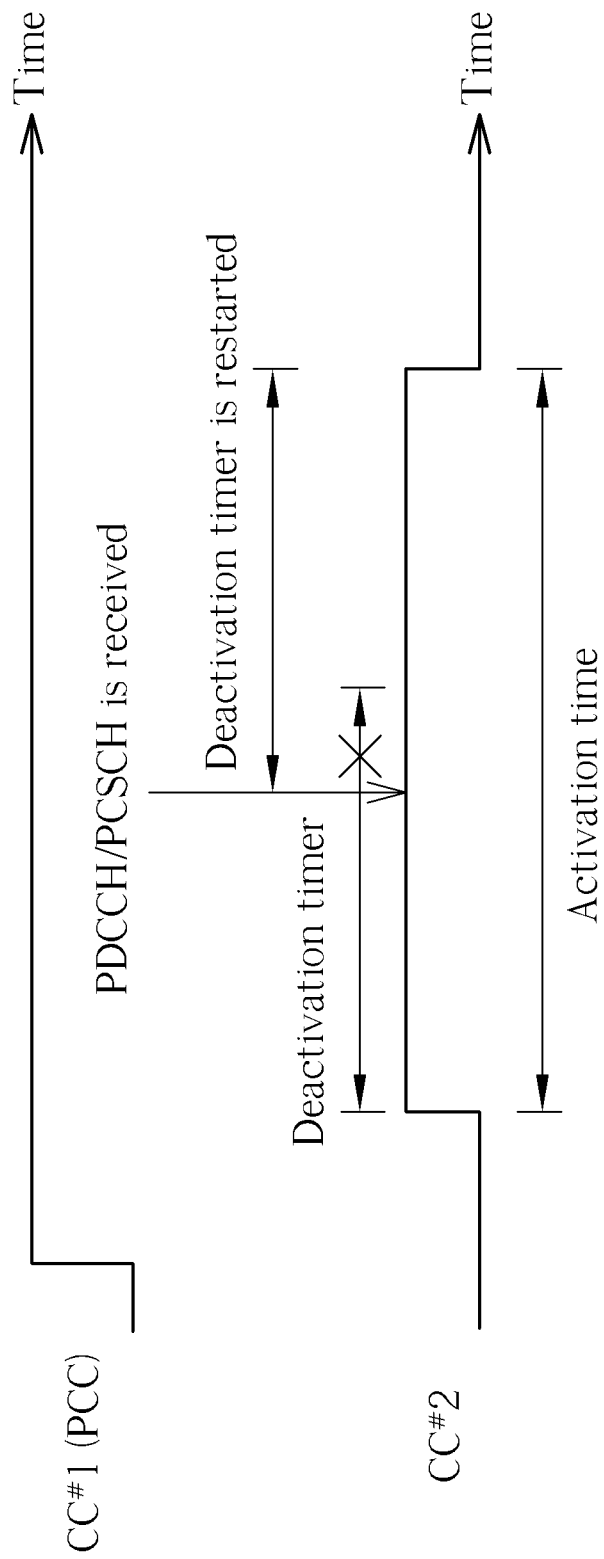
FIG. 22(A)-22(C) are component carrier activation-deactivation time diagrams according to different embodiments.
Figure 22B:
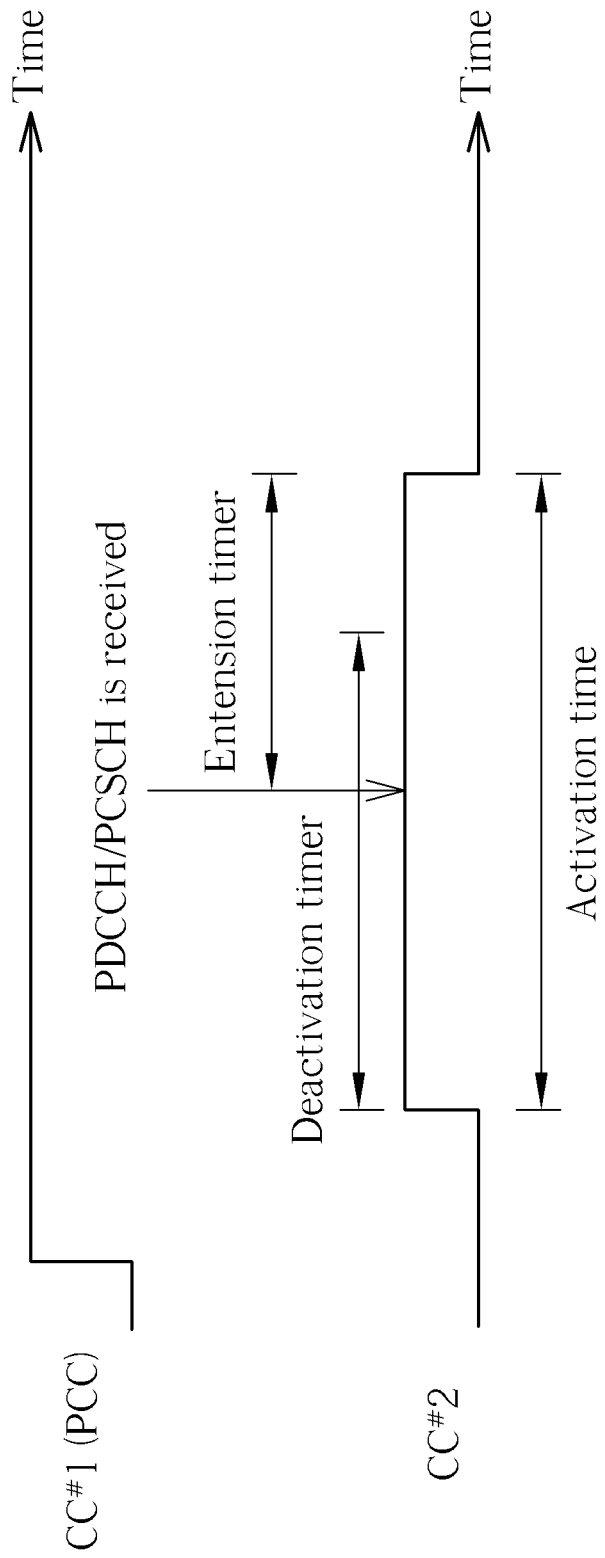
Figure 22C:
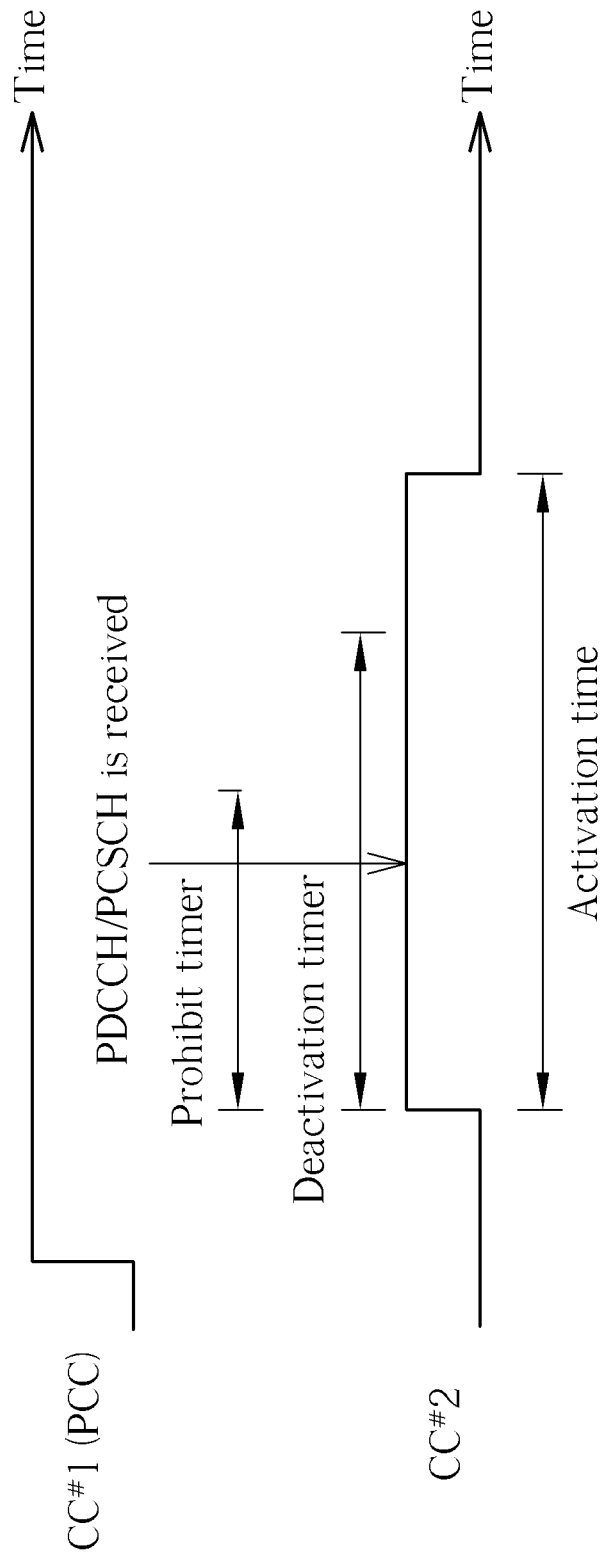

Take an example based on the process 210. Please refer to FIG. 22(A)-22(C). In FIG. 22(A), the UE starts the deactivation timer when the component carrier cc#2 is activated, and receives the PDCCH/PDSCH on the component carrier cc#2. However, the UE may not finish the upcoming transmission (e.g. a new downlink/uplink transmission) on the component carrier cc#2 before deactivation of the component carrier (e.g. due to receiving a deactivation command or expiry of the deactivation timer). In this situation, the UE restarts/starts the deactivation timer/extension timer for extending activation time of the component carrier cc#2, so as to perform the upcoming transmission. On the other hand, the UE may start the prohibit timer for the component carrier cc#2 when the deactivation timer/extension timer is started or restarted, and thereby restarts/starts deactivation timer/extension timer for the component carrier cc#2 when the prohibit timer expires, so as to avoid redundant timer start or restart.

Please note that, for any of the process 40, 70, 90, 100, 120, 140, 190, and 2100, the network (i.e. the eNB) may send a signaling (e.g. a PHY, a MAC control element or a RRC message) for component carrier deactivation to the UE, and thereby the UE or the eNB performs at least one of the following steps:
1. Stop the deactivation timer for the corresponding component carrier.
2. Stop the extension timer for the corresponding component carrier.
3. Flush the HARQ buffer for the corresponding component carrier.
4. Release Physical Uplink Control Channel (PUCCH) on the corresponding component carrier.
5. Stop and/or Release Sounding Reference Signal (SRS) on the corresponding component carrier.
6. Clear any configured downlink assignment and uplink grant on the corresponding component carrier.
7. Stop CQI/PMI/RI reporting for the component carrier
8. Stop PDCCH monitoring for the component carrier Therefore, a way of deactivating an activated component carrier is clearly specified.

In conclusion, the present invention provides methods and apparatus for component carrier activation and deactivation, so as to enhance performance of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling component carrier activation and deactivation for a mobile device capable of receiving and transmitting on a plurality of component carriers in a wireless communication system, the method comprising:
   starting a deactivation timer for a component carrier of the plurality of component carriers when the component carrier is activated, wherein the deactivation timer provides a period of time for component carrier activation;
   starting a prohibit timer for the component carrier when the deactivation timer is started or restarted, wherein the prohibit timer provides a period of time during which the mobile device does not restart the deactivation timer for the component carrier;
   performing a Hybrid Automatic Repeat Request (HARQ) process on the component carrier; and
   extending activation time of the component carrier when a retransmission of the HARQ process is not finished before deactivation of the component carrier and the prohibit timer expires.

2. The method of claim 1, wherein performing the HARQ process on the component carrier comprises:
   receiving a HARQ feedback corresponding to an uplink transmission on the component carrier;
   wherein extending activation time of the component carrier when the retransmission of the HARQ process is not finished before deactivation of the component carrier comprises:
      restarting or starting an extension timer for the component carrier when the HARQ process retransmission is not finished before deactivation of the component carrier and the HARQ feedback is received, wherein the extension timer is the deactivation timer or is a specific timer used for providing a period time for component carrier activation.

3. The method of claim 2, wherein restarting or starting the extension timer for the component carrier when the HARQ process retransmission is not finished before deactivation of the component carrier and the HARQ feedback is received comprises:
   restarting or starting the extension timer for the component carrier when the HARQ process retransmission is not finished before deactivation of the component carrier, the HARQ feedback is received and the prohibit timer expires.

4. The method of claim 2, further comprising:
   deactivating the component carrier when at least one of the deactivation timer expires, the extension timer expires, and a signaling for component carrier deactivation is received from a network of the wireless communication system; and
   performing at least one of the following steps:
   stopping the deactivation timer or the extension timer;
   flushing a HARQ buffer corresponding to the HARQ process;
   stopping or releasing Physical Uplink Control Channel (PUCCH) or Sounding Reference Signal (SRS) on the component carrier;
   clearing any configured downlink assignment and uplink grant on the component carrier;
   stopping CQI/PMI/RI reporting for the component carrier; and
   stopping PDCCH monitoring for the component carrier.

5. The method of claim 1, wherein performing the HARQ process on the component carrier comprises:
   starting a HARQ round trip time (RTT) timer for the component carrier when a downlink transmission is received on the component carrier, wherein the HARQ process retransmission is not received during duration of the HARQ RTT timer;

wherein extending activation time of the component carrier when the retransmission of the HARQ process is not finished before deactivation of the component carrier comprises:

restarting or starting an extension timer for the component carrier when the HARQ process retransmission is not finished before deactivation of the component carrier and the HARQ RTT timer expires, wherein the extension timer is the deactivation timer or is a specific timer used for providing a period time for component carrier activation; or restarting or starting the extension timer for the component carrier when the HARQ process retransmission is not finished before expiry of the deactivation timer and the HARQ RTT timer is started, wherein the extension timer is the deactivation timer or is a specific timer used for providing a period time for component carrier activation.

6. The method of claim 5, further comprising:

deactivating the component carrier when at least one of the deactivation timer expires, the extension timer expires, and a signaling for component carrier deactivation is received from a network of the wireless communication system; and performing at least one of the following steps:

stopping the deactivation timer or the extension timer;

flushing a HARQ buffer corresponding to the HARQ process;

stopping or releasing Physical Uplink Control Channel (PUCCH) or Sounding Reference Signal (SRS) on the component carrier;

clearing any configured downlink assignment and uplink grant on the component carrier;

stopping CQI/PMI/RI reporting for the component carrier; and stopping PDCCH monitoring for the component carrier.

7. The method of claim 5, wherein restarting or starting the extension timer for the component carrier when the HARQ process retransmission is not finished before deactivation of the component carrier and the HARQ RTT timer expires comprises:

restarting or starting the extension timer for the component carrier when the HARQ process retransmission is not finished before deactivation of the component carrier, the HARQ RTT timer expires and the prohibit timer expires; or wherein restarting or starting the extension timer for the component carrier when the HARQ process retransmission is not finished before deactivation of the component carrier and the HARQ RTT timer is started comprises:

restarting or starting the extension timer for the component carrier when the HARQ process retransmission is not finished before deactivation of the component carrier, the HARQ RTT timer is started, and the prohibit timer expires.

8. A method of handling component carrier activation and deactivation for a mobile device capable of receiving and transmitting on a plurality of component carriers in a wireless communication system, the method comprising:

starting a deactivation timer for a component carrier of the plurality of component carriers when the component carrier is activated, wherein the deactivation timer provides a period of time for component carrier activation;

starting a prohibit timer for the component carrier when the deactivation timer is started or restarted, wherein the prohibit timer provides a period of time during which the mobile device does not restart the deactivation timer for the component carrier;

initiating a scheduling request (SR) procedure; and extending activation time of the component carrier when an uplink resource corresponding to the SR procedure is not received before deactivation of the component carrier and the prohibit timer expires.

9. The method of claim 8, wherein extending activation time of the component carrier when the uplink resource corresponding to the SR procedure is not received before deactivation of the component carrier comprises:

restarting or starting an extension timer for the component carrier when the uplink resource corresponding to the SR procedure is not received before deactivation of the component carrier, wherein the extension timer is the deactivation timer or is a specific timer used for providing a period time for component carrier activation.

10. The method of claim 9, further comprising:

deactivating the component carrier when at least one of the deactivation timer expires, the extension timer expires, and a signaling for component carrier deactivation is received from a network of the wireless communication system; and performing at least one of the following steps:

stopping the deactivation timer or the extension timer;

flushing HARQ buffer for the component carrier;

stopping or releasing Physical Uplink Control Channel (PUCCH) or Sounding Reference Signal (SRS) on the component carrier;

clearing any configured downlink assignment and uplink grant on the component carrier;

stopping CQI/PMI/RI reporting for the component carrier; and stopping PDCCH monitoring for the component carrier.

11. The method of claim 9, wherein restarting or starting the extension timer for the component carrier when the uplink resource corresponding to the SR procedure is not received before deactivation of the component carrier comprises:

restarting or starting the extension timer for the component carrier when the uplink resource corresponding to the SR procedure is not received before deactivation of the component carrier and the prohibit timer expires.

12. A method of handling component carrier activation and deactivation for a mobile device capable of receiving and transmitting on a plurality of component carriers in a wireless communication system, the method comprising:

starting a deactivation timer for a component carrier of the plurality of component carriers when the component carrier is activated, wherein the deactivation timer provides a period of time for component carrier activation;

starting a prohibit timer for the component carrier when the deactivation timer is started or restarted, wherein the prohibit timer provides a period of time during which the mobile device does not restart the deactivation timer for the component carrier;

performing a discontinuous reception (DRX) operation on the component carrier; and extending activation time of the component carrier when the component carrier is going to be deactivated during an DRX active time of a DRX cycle of the DRX operation and the prohibit timer expires.

13. The method of claim 12, further comprising:
deactivating the component carrier after the DRX active time when the component carrier is going to be deactivated during the DRX active time of the DRX cycle of the DRX operation.

14. The method of claim 12, wherein extending activation time of the component carrier when the component carrier is going to be deactivated during the DRX active time of the DRX cycle of the DRX operation comprises:
extending activation time of the component carrier until the end of the DRX active time when the component carrier is going to be deactivated during the DRX active time of the DRX cycle of the DRX operation.

15. A method of handling component carrier activation and deactivation for a mobile device capable of receiving and transmitting on a plurality of component carriers in a wireless communication system, the method comprising:
starting a deactivation timer for a component carrier of the plurality of component carriers when the component carrier is activated, wherein the deactivation timer provides a period of time for component carrier activation;
starting a prohibit timer for the component carrier when the deactivation timer is started or restarted, wherein the prohibit timer provides a period of time during which the mobile device does not restart the deactivation timer for the component carrier;
performing a random access procedure; and
extending activation time of the component carrier when the random access procedure is not finished before deactivation of the component carrier and the prohibit timer expires.

16. The method of claim 15, wherein the random access procedure is a contention based random access procedure or a non-contention based random access procedure, and extending activation time of the component carrier when the random access procedure is not finished before deactivation of the component carrier comprises:
extending activation timer of the component carrier when a contention resolution message is not received before deactivation of the component carrier or when a random access response message is not received before deactivation of the component carrier.

17. The method of claim 16, wherein extending activation time of the component carrier when the contention resolution message is not received before deactivation of the component carrier or when the random access response message is not received before deactivation of the component carrier comprises:
restarting or starting an extension timer for the component carrier after a scheduled transmission message is sent, when the contention resolution message of the contention based random access procedure is not received before deactivation of the component carrier; or
restarting or starting an extension timer for the component carrier when the random access response message is not received before deactivation of the component carrier, wherein the extension timer is the deactivation timer or a specific timer providing a period time for component carrier activation.

18. The method of claim 17, further comprising:
deactivating the component carrier when at least one of the deactivation timer expires, the extension timer expires, and a signaling for component carrier deactivation is received from a network of the wireless communication system; and
performing at least one of the following steps:
stopping the deactivation timer or the extension timer;
flushing HARQ buffer for the component carrier;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

19. A method of handling component carrier activation and deactivation for a mobile device capable of receiving and transmitting on a plurality of component carriers in a wireless communication system, the method comprising:
starting a deactivation timer for a component carrier of the plurality of component carriers when the component carrier is activated, wherein the deactivation timer provides a period of time for component carrier activation; and
extending activation time of the component carrier when a Physical Downlink Control Channel (PDCCH) indicating an uplink grant or downlink assignment is received for a first component carrier of the plurality of component carriers, from the component carrier; and
not extending activation time of the component carrier when no PDCCH indicating an uplink grant or downlink assignment is received from the component carrier.

20. The method of claim 19, wherein extending activation time of the component carrier when the PDCCH indicating the uplink grant or downlink assignment is received for the first component carrier of the plurality of component carriers, from the component carrier comprises:
while the first component carrier is activated, keeping the component carrier activated for reception of the PDCCH assignment for the first component carrier when the component carrier is going to be deactivated; or
starting or restarting the deactivation timer when a first deactivation timer for the first component carrier is started or restarted and the component carrier is going to be deactivated; or
starting or restarting an extension timer when a first extension timer for the first component carrier is started or restarted and the component carrier is going to be deactivated, wherein the extension timer is a specific timer providing a period time for component carrier activation.

21. The method of claim 20, further comprising:
starting a prohibit timer for the component carrier when the deactivation timer is started or restarted;
wherein starting or restarting the deactivation timer when the first deactivation timer for the first component carrier is started or restarted and the component carrier is going to be deactivated comprises:
starting or restarting the deactivation timer when the first deactivation timer for the first component carrier is started or restarted and the prohibit timer expires; or
wherein starting or restarting the extension timer when the first extension timer for the first component carrier is started or restarted and the component carrier is going to be deactivated comprises:
starting or restarting the extension timer when the first extension timer for the first component carrier is started or restarted and the prohibit timer expires.

22. The method of claim 20, further comprising:
deactivating the component carrier when at least one of the deactivation timer expires, the extension timer expires, and a signaling for component carrier deactivation is received from a network of the wireless communication system; and performing at least one of the following steps:
stopping the deactivation timer or the extension timer;
flushing HARQ buffer for the component carrier;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

23. A method of handling component carrier activation and deactivation for a mobile device capable of receiving and transmitting on a plurality of component carriers in a wireless communication system, the method comprising:
starting a deactivation timer for a component carrier of the plurality of component carriers when the component carrier is activated, wherein the deactivation timer provides a period of time for component carrier activation;
extending activation time of the component carrier when a Physical Downlink Control Channel (PDCCH) indicating an uplink grant or downlink assignment for the component carrier is received; and
not extending activation time of the component carrier when no PDCCH indicating an uplink grant or downlink assignment is received.

24. The method of claim 23, wherein extending activation time of the component carrier when the PDCCH indicating the uplink grant or downlink assignment for the component carrier is received comprises:
restarting or starting an extension timer for the component carrier when receiving a physical downlink shared channel (PDSCH) or Physical Downlink Control Channel (PDCCH) on the component carrier or the upcoming transmission corresponding to the PDCCH or PDSCH assignment is not finished before deactivation of the component carrier, wherein the extension timer is the deactivation timer or a specific timer providing a period time for component carrier activation.

25. The method of claim 24, further comprising:
deactivating the component carrier when at least one of the deactivation timer expires, the extension timer expires, and a signaling for component carrier deactivation is received from a network of the wireless communication system; and
performing at least one of the following steps:
stopping the deactivation timer or the first timer;
flushing HARQ buffer for the component carrier;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

26. The method of claim 24, further comprising:
starting a prohibit timer for the component carrier when the deactivation timer is started or restarted;
wherein restarting or starting the extension timer for the component carrier when the upcoming transmission corresponding to the PDCCH or PDSCH assignment is not finished before deactivation of the component carrier comprises:
restarting or starting the extension timer for the component carrier when receiving a physical downlink shared channel (PDSCH) or Physical Downlink Control Channel (PDCCH) on the component carrier or the upcoming transmission corresponding to the PDCCH or PDSCH assignment is not finished before deactivation of the component carrier, and the prohibit timer expires.

27. A mobile device of a wireless communication system for handling component carrier activation and deactivation, the mobile device capable of receiving and transmitting on a plurality of component carriers, the mobile device comprising:
means for starting a deactivation timer for a component carrier of the plurality of component carriers when the component carrier is activated, wherein the deactivation timer provides a period of time for component carrier activation;
means for starting a prohibit timer for the component carrier when the deactivation timer is started or restarted, wherein the prohibit timer provides a period of time during which the mobile device does not restart the deactivation timer for the component carrier;
means for performing a Hybrid Automatic Repeat Request (HARQ) process on the component carrier; and
means for extending activation time of the component carrier when a retransmission of the HARQ process is not finished before deactivation of the component carrier and the prohibit timer expires.

28. The mobile device of claim 27, wherein the means for performing the HARQ process on the component carrier comprises:
means for receiving a HARQ feedback corresponding to an uplink transmission on the component carrier;
wherein the means for extending activation time of the component carrier when the retransmission of the HARQ process is not finished before deactivation of the component carrier comprises:
means for restarting or starting an extension timer for the component carrier when the HARQ process retransmission is not finished before deactivation of the component carrier and the HARQ feedback is received, wherein the extension timer is the deactivation timer or is a specific timer used for providing a period time for component carrier activation.

29. The mobile device of claim 28,
wherein the means for restarting or starting the extension timer for the component carrier when the HARQ process retransmission is not finished before deactivation of the component carrier and the HARQ feedback is received comprises:
means for restarting or starting the extension timer for the component carrier when the HARQ process retransmission is not finished before deactivation of the component carrier, the HARQ feedback is received and the prohibit timer expires.

30. The mobile device of claim 28, further comprising:
means for deactivating the component carrier when at least one of the deactivation timer expires, the extension timer expires, and a signaling for component carrier deactivation is received from a network of the wireless communication system; and
means for performing at least one of the following steps:
stopping the deactivation timer or the extension timer;
flushing a HARQ buffer corresponding to the HARQ process;

stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

31. The mobile device of claim 27, wherein the means for performing the HARQ process on the component carrier comprises:
means for starting a HARQ round trip time (RTT) timer for the component carrier when a downlink transmission is received on the component carrier, wherein the HARQ process retransmission is not received during duration of the HARQ RTT timer;
wherein the means for extending activation time of the component carrier when the retransmission of the HARQ process is not finished before deactivation of the component carrier comprises:
means for restarting or starting an extension timer for the component carrier when the HARQ process retransmission is not finished before deactivation of the component carrier and the HARQ RTT timer expires, wherein the extension timer is the deactivation timer or is a specific timer used for providing a period time for component carrier activation; or
means for restarting or starting the extension timer for the component carrier when the HARQ process retransmission is not finished before expiry of the deactivation timer and the HARQ RTT timer is started, wherein the extension timer is the deactivation timer or is a specific timer used for providing a period time for component carrier activation.

32. The mobile device of claim 31, further comprising:
means for deactivating the component carrier when at least one of the deactivation timer expires, the extension timer expires, and a signaling for component carrier deactivation is received from a network of the wireless communication system; and
means for performing at least one of the following steps:
stopping the deactivation timer or the extension timer;
flushing a HARQ buffer corresponding to the HARQ process;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

33. The mobile device of claim 31,
wherein the means for restarting or starting the extension timer for the component carrier when the HARQ process retransmission is not finished before deactivation of the component carrier and the HARQ RTT timer expires comprises:
means for restarting or starting the extension timer for the component carrier when the HARQ process retransmission is not finished before deactivation of the component carrier, the HARQ RTT timer expires and the prohibit timer expires; or
wherein the means for restarting or starting the extension timer for the component carrier when the HARQ process retransmission is not finished before deactivation of the component carrier and the HARQ RTT timer is started comprises:
means for restarting or starting the extension timer for the component carrier when the HARQ process retransmission is not finished before deactivation of the component carrier, the HARQ RTT timer is started, and the prohibit timer expires.

34. A mobile device of a wireless communication system for handling component carrier activation and deactivation, the mobile device capable of receiving and transmitting on a plurality of component carriers, the mobile device comprising:
means for starting a deactivation timer for a component carrier of the plurality of component carriers when the component carrier is activated, wherein the deactivation timer provides a period of time for component carrier activation;
means for starting a prohibit timer for the component carrier when the deactivation timer is started or restarted, wherein the prohibit timer provides a period of time during which the mobile device does not restart the deactivation timer for the component carrier;
means for initiating a scheduling request (SR) procedure; and
means for extending activation time of the component carrier when an uplink resource corresponding to the SR procedure is not received before deactivation of the component carrier and the prohibit timer expires.

35. The mobile device of claim 34, wherein the means for extending activation time of the component carrier when the uplink resource corresponding to the SR procedure is not received before deactivation of the component carrier comprises:
means for restarting or starting an extension timer for the component carrier when the uplink resource corresponding to the SR procedure is not received before deactivation of the component carrier, wherein the extension timer is the deactivation timer or is a specific timer used for providing a period time for component carrier activation.

36. The mobile device of claim 35, further comprising:
means for deactivating the component carrier when at least one of the deactivation timer expires, the extension timer expires, and a signaling for component carrier deactivation is received from a network of the wireless communication system; and
means for performing at least one of the following steps:
stopping the deactivation timer or the extension timer;
flushing HARQ buffer for the component carrier;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

37. The mobile device of claim 35,
wherein the means for restarting or starting the extension timer for the component carrier when the uplink resource corresponding to the SR procedure is not received before deactivation of the component carrier comprises:
means for restarting or starting the extension timer for the component carrier when the uplink resource corresponding to the SR procedure is not received before deactivation of the component carrier and the prohibit timer expires.

38. A mobile device of a wireless communication system for handling component carrier activation and deactivation, the mobile device capable of receiving and transmitting on a plurality of component carriers, the mobile device comprising:

means for starting a deactivation timer for a component carrier of the plurality of component carriers when the component carrier is activated, wherein the deactivation timer provides a period of time for component carrier activation;

means for starting a prohibit timer for the component carrier when the deactivation timer is started or restarted, wherein the prohibit timer provides a period of time during which the mobile device does not restart the deactivation timer for the component carrier;

means for performing a discontinuous reception (DRX) operation on the component carrier; and means for extending activation time of the component carrier when the component carrier is going to be deactivated during an DRX active time of a DRX cycle of the DRX operation and the prohibit timer expires.

39. The mobile device of claim 38, further comprising:
means for deactivating the component carrier after the DRX active time when the component carrier is going to be deactivated during the DRX active time of the DRX cycle of the DRX operation .

40. The mobile device of claim 38, wherein the means for extending activation time of the component carrier when the component carrier is going to be deactivated during the DRX active time of the DRX cycle of the DRX operation comprises:

means for extending activation time of the component carrier until the end of the DRX active time when the component carrier is going to be deactivated during the DRX active time of the DRX cycle of the DRX operation.

41. A mobile device of a wireless communication system for handling component carrier activation and deactivation, the mobile device capable of receiving and transmitting on a plurality of component carriers, the mobile device comprising:

means for starting a deactivation timer for a component carrier of the plurality of component carriers when the component carrier is activated, wherein the deactivation timer provides a period of time for component carrier activation;

means for starting a prohibit timer for the component carrier when the deactivation timer is started or restarted, wherein the prohibit timer provides a period of time during which the mobile device does not restart the deactivation timer for the component carrier;

means for performing a random access procedure; and means for extending activation time of the component carrier when the random access procedure is not finished before deactivation of the component carrier and the prohibit timer expires.

42. The mobile device of claim 41, wherein the random access procedure is a contention based random access procedure or a non-contention based random access procedure, and the means for extending activation time of the component carrier when the random access procedure is not finished before deactivation of the component carrier comprises:

means for extending activation timer of the component carrier when a contention resolution message is not received before deactivation of the component carrier or when a random access response message is not received before deactivation of the component carrier.

43. The mobile device of claim 42, wherein the means for extending activation time of the component carrier when the contention resolution message is not received before deactivation of the component carrier or when the random access response message is not received before deactivation of the component carrier comprises:

means for restarting or starting an extension timer for the component carrier after a scheduled transmission message is sent, when the contention resolution message of the contention based random access procedure is not received before deactivation of the component carrier; or means for restarting or starting an extension timer for the component carrier when the random access response message is not received before deactivation of the component carrier, wherein the extension timer is the deactivation timer or a specific timer providing a period time for component carrier activation.

44. The mobile device of claim 43, further comprising:
means for deactivating the component carrier when at least one of the deactivation timer expires, the extension timer expires, and a signaling for component carrier deactivation is received from a network of the wireless communication system; and means for performing at least one of the following steps:
stopping the deactivation timer or the extension timer;
flushing HARQ buffer for the component carrier;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

45. A mobile device of a wireless communication system for handling component carrier activation and deactivation, the mobile device capable of receiving and transmitting on a plurality of component carriers, the mobile device comprising:

means for starting a deactivation timer for a component carrier of the plurality of component carriers when the component carrier is activated, wherein the deactivation timer provides a period of time for component carrier activation; and means for extending activation time of the component carrier when a Physical Downlink Control Channel (PDCCH) indicating an uplink grant or downlink assignment is received for a first component carrier of the plurality of component carriers, from the component carrier, and not extending activation time of the component carrier when no PDCCH indicating an uplink grant or downlink assignment is received from the component carrier.

46. The mobile device of claim 45, wherein the means for extending activation time of the component carrier when the PDCCH indicating the uplink grant or downlink assignment is received for the first component carrier of the plurality of component carriers, from the component carrier comprises:

means for while the first component carrier is activated, keeping the component carrier activated for reception of the PDCCH assignment for the first component carrier when the component carrier is going to be deactivated; or means for starting or restarting the deactivation timer when a first deactivation timer for the first component carrier is started or restarted and the component carrier is going to be deactivated; or means for starting or restarting an extension timer when a first extension timer for the first component carrier is started or restarted and the component carrier is going to be deactivated, wherein the extension timer is a specific timer providing a period time for component carrier activation.

47. The mobile device of claim 46, further comprising:
means for starting a prohibit timer for the component carrier when the deactivation timer is started or restarted;
wherein the means for starting or restarting the deactivation timer when the first deactivation timer for the first component carrier is started or restarted and the component carrier is going to be deactivated comprises:
means for starting or restarting the deactivation timer when the first deactivation timer for the first component carrier is started or restarted and the prohibit timer expires; or
wherein the means for starting or restarting the extension timer when the first extension timer for the first component carrier is started or restarted and the component carrier is going to be deactivated comprises:
means for starting or restarting the extension timer when the first extension timer for the first component carrier is started or restarted and the prohibit timer expires.

48. The mobile device of claim 46, further comprising:
means for deactivating the component carrier when at least one of the deactivation timer expires, the extension timer expires, and a signaling for component carrier deactivation is received from a network of the wireless communication system; and
means for performing at least one of the following steps:
stopping the deactivation timer or the extension timer;
flushing HARQ buffer for the component carrier;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

49. A mobile device of a wireless communication system for handling component carrier activation and deactivation, the mobile device capable of receiving and transmitting on a plurality of component carriers, the mobile device comprising:
means for starting a deactivation timer for a component carrier of the plurality of component carriers when the component carrier is activated, wherein the deactivation timer provides a period of time for component carrier activation;

means for extending activation time of the component carrier when a Physical Downlink Control Channel (PDCCH) indicating an uplink grant or downlink assignment for the component carrier is received; and not extending activation time of the component carrier when no PDCCH indicating an uplink grant or downlink assignment is received.

50. The mobile device of claim 49, wherein the means for extending activation time of the component carrier when the PDCCH indicating the uplink grant or downlink assignment for the component carrier is received comprises:
means for restarting or starting an extension timer for the component carrier when receiving a physical downlink shared channel (PDSCH) or Physical Downlink Control Channel (PDCCH) on the component carrier or the upcoming transmission corresponding to the PDCCH or PDSCH assignment is not finished before deactivation of the component carrier, wherein the extension timer is the deactivation timer or a specific timer providing a period time for component carrier activation.

51. The mobile device of claim 50, further comprising:
means for deactivating the component carrier when at least one of the deactivation timer expires, the extension timer expires, and a signaling for component carrier deactivation is received from a network of the wireless communication system; and
means for performing at least one of the following steps:
stopping the deactivation timer or the first timer;
flushing HARQ buffer for the component carrier;
stopping or releasing Physical Uplink Control Channel (PUCCH) or Sounding Reference Signal (SRS) on the component carrier;
clearing any configured downlink assignment and uplink grant on the component carrier;
stopping CQI/PMI/RI reporting for the component carrier; and
stopping PDCCH monitoring for the component carrier.

52. The mobile device of claim 50, further comprising:
means for starting a prohibit timer for the component carrier when the deactivation timer is started or restarted;
wherein the means for restarting or starting the extension timer for the component carrier when the upcoming transmission corresponding to the PDCCH or PDSCH assignment is not finished before deactivation of the component carrier comprises:
means for restarting or starting the extension timer for the component carrier when receiving a physical downlink shared channel (PDSCH) or Physical Downlink Control Channel (PDCCH) on the component carrier or the upcoming transmission corresponding to the PDCCH or PDSCH assignment is not finished before deactivation of the component carrier, and the prohibit timer expires.

* * * * *